(12) United States Patent
Zhang

(10) Patent No.: US 12,475,314 B2
(45) Date of Patent: Nov. 18, 2025

(54) DEVICE CONTROL MESSAGING GROUP

(71) Applicant: Tencent Technology (Shenzhen) Company Limited, Guangdong (CN)

(72) Inventor: Mingyuan Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/124,321

(22) Filed: Mar. 21, 2023

(65) Prior Publication Data

US 2023/0237264 A1 Jul. 27, 2023

Related U.S. Application Data

(63) Continuation of application No. 16/542,131, filed on Aug. 15, 2019, now Pat. No. 11,657,224, which is a
(Continued)

(30) Foreign Application Priority Data

Mar. 10, 2017 (CN) .......................... 201710143056.6
Mar. 10, 2017 (CN) .......................... 201710143074.4

(51) Int. Cl.
H04L 67/125 (2022.01)
G06F 40/279 (2020.01)
(Continued)

(52) U.S. Cl.
CPC ........... *G06F 40/279* (2020.01); *G06N 20/00* (2019.01); *H04L 12/185* (2013.01);
(Continued)

(58) Field of Classification Search
CPC ..... H04L 51/216; H04L 51/58; H04L 51/046; H04L 67/125; G05B 15/02; G05B 19/418
See application file for complete search history.

(56) References Cited

U.S. PATENT DOCUMENTS 7,403,838 B2 * 7/2008 Deen ...................... G05B 15/02
709/227
9,985,796 B2 * 5/2018 Cregg ...................... H04B 3/54
(Continued)

FOREIGN PATENT DOCUMENTS

CN 102196012 A 9/2011
CN 103188204 A 7/2013
(Continued)

OTHER PUBLICATIONS

Chinese Office Action mailed Feb. 24, 2018 in Chinese Patent Application No. 201710143056.6 with English concise explanation of relevance.
(Continued)

Primary Examiner — Ryan J Jakovac
(74) Attorney, Agent, or Firm — ArentFox Schiff LLP

(57) ABSTRACT

A device control method is provided. In the method, a first message is received from a first device of a device messaging group. The first device is associated with a first identifier in the device messaging group. The first message indicates at least one of a state of the first device or detected environment information. A second message is generated based on the first message received from the first device. The second message is sent to a second device of the device messaging group. The second device is associated with a second identifier in the device messaging group.

20 Claims, 12 Drawing Sheets

Related U.S. Application Data continuation of application No. PCT/CN2018/077808, filed on Mar. 2, 2018.

(51) Int. Cl.
*G06N 20/00* (2019.01)
*H04L 12/18* (2006.01)
*H04L 12/28* (2006.01)
*H04L 51/046* (2022.01)
*H04L 51/216* (2022.01)
*H04L 51/58* (2022.01)

(52) U.S. Cl.
CPC ........ *H04L 12/2816* (2013.01); *H04L 51/046* (2013.01); *H04L 51/216* (2022.05); *H04L 51/58* (2022.05); *H04L 67/125* (2013.01); *H04L 12/2818* (2013.01)

(56) References Cited

U.S. PATENT DOCUMENTS

| | | |
|---|---|---|
| 2007/0133756 A1 | 6/2007 | Graves, III |
| 2009/0037536 A1 | 2/2009 | Braam |
| 2012/0254428 A1 | 10/2012 | Isozaki et al. |
| 2013/0300546 A1 | 11/2013 | Kim et al. |
| 2015/0120784 A1 | 4/2015 | Satoh |
| 2015/0370615 A1 | 12/2015 | Pi-Sunyer |
| 2016/0177546 A1 | 6/2016 | Creg |
| 2017/0357607 A1 | 12/2017 | Cayemberg |
| 2018/0211666 A1 | 7/2018 | Kolavennu |

FOREIGN PATENT DOCUMENTS

| | | | |
|---|---|---|---|
| CN | 104023012 A | 9/2014 | |
| CN | 104460328 A | 3/2015 | |
| CN | 104601445 A | 5/2015 | |
| CN | 104661057 A | 5/2015 | |
| CN | 104966192 A | 10/2015 | |
| CN | 105049337 A | 11/2015 | |
| CN | 105739447 A | 7/2016 | |
| CN | 106413124 A | 2/2017 | |
| CN | 106878449 A | 6/2017 | |
| CN | 107070891 A | 8/2017 | |
| WO | WO-2015109946 A1 * | 7/2015 | ............. H04L 51/02 |
| WO | WO-2017030433 A1 * | 2/2017 | |

OTHER PUBLICATIONS

Chinese Office Action mailed Feb. 27, 2018 in Chinese Patent Application No. 20171014307 4.4 with English concise explanation of relevance.

Chinese Office Action mailed May 29, 2018 in Chinese Patent Application No. 201710143074.4 with English concise explanation of relevance.

PCT International Search Report with PCT Written Opinion of the International Searching Authority mailed May 25, 2018 in PCT/CN2018/077808.

* cited by examiner

DEVICE CONTROL MESSAGING GROUP

RELATED APPLICATION

The present application claims the benefit of priority to U.S. patent application Ser. No. 16/542,131, "DEVICE CONTROL METHOD, STORAGE MEDIUM, AND COMPUTER DEVICE" filed on Aug. 15, 2019, which is a continuation of International Application No. PCT/CN2018/077808, filed on Mar. 2, 2018, which claims priority to Chinese Patent Application No. 201710143074.4, filed on Mar. 10, 2017 and entitled "DEVICE CONTROL METHOD AND APPARATUS", and Chinese Patent Application No. 201710143056.6, filed on Mar. 10, 2017 and entitled "SERVICE CALL METHOD AND APPARATUS". The entire disclosures of the prior applications are hereby incorporated by reference in their entirety.

FIELD OF THE TECHNOLOGY

This application relates to the field of computer technologies, and in particular, to a device control method, a storage medium, and a computer device.

BACKGROUND OF THE DISCLOSURE

With development of computer technologies, smart devices have been more widely applied to people's life. Various smart devices bring great convenience to people's life and work. The smart devices may be, for example, smart refrigerators, smart water purifiers, or smart air purifiers.

In some applications, for a smart device, a user may install a control program for the smart device on a mobile terminal, so that the user may use an interaction interface provided by the control program on the mobile terminal to control the smart device.

However, smart devices are still mainly controlled in real time according to user's operations, or automatically operate in a mode that is set by a user. Because user participation is required and the operations can be complex, the efficiency of controlling a smart device is relatively low.

SUMMARY

According to various embodiments provided in this application, device control methods, non-transitory computer-readable storage mediums, and computer devices are provided.

According to one or more embodiments described in this disclosure, a device control method includes obtaining, by processing circuitry of a device, a first message that is indicated as from a first device associated with a first device identifier in an instant messaging group and determining, by the processing circuitry according to the first message, control-related information corresponding to at least a second device associated with a second device identifier in the instant messaging group. The method further includes generating, by the processing circuitry according to the control-related information, a device control command corresponding to the second device, transmitting, by the processing circuitry, the device control command to the second device, and receiving, by the processing circuitry, a second message that is sent by the second device. The second message includes a device control command execution result regarding the second device executing the device control command.

According to one or more embodiments described in this disclosure, a device control method includes obtaining, by processing circuitry of a device, a first message that is indicated as from a first device associated with a first device identifier in an instant messaging group, and sending, by the processing circuitry, the first message to at least a second device associated with a second device identifier in the instant messaging group, so that the second device determines, according to the first message, control-related information corresponding to the second device, generates a first device control command according to the control-related information, and executes the generated first device control command. The method further includes receiving, by the processing circuitry, a second message that is sent by the second device. The second message includes a first device control command execution result regarding the second device executing the first device control command.

According to one or more embodiments described in this disclosure, a non-transitory computer-readable storage medium storing computer-readable instructions is described. The computer-readable instructions, which when executed by one or more processors, cause the one or more processors to perform a method that includes obtaining a first message that is indicated as from a first device associated with a first device identifier in an instant messaging group, determining, according to the first message, control-related information corresponding to at least a second device associated with a second device identifier in the instant messaging group, generating, according to the control-related information, a device control command corresponding to the second device, transmitting the device control command to the second device, and receiving a second message that is sent by the second device. The second message includes a device control command execution result regarding the second device executing the device control command.

According to one or more embodiments described in this disclosure, a non-transitory computer-readable storage medium storing computer-readable instructions is described. The computer-readable instructions, which when executed by one or more processors, cause the one or more processors to perform a method that includes obtaining a first message that is indicated as from a first device associated with a first device identifier in an instant messaging group, and sending the first message to at least a second device associated with a second device identifier in the instant messaging group, so that the second device determines, according to the first message, control-related information corresponding to the second device, generates a device control command according to the control-related information, and executes the generated device control command. The computer-readable instructions, which when executed by the one or more processors, cause the one or more processors to perform the method that further includes receiving a second message that is sent by the second device. The second message includes a device control command execution result regarding the second device executing the device control command.

According to one or more embodiments described in this disclosure, a computer device includes processing circuitry configured to obtain a first message that is indicated as from a first device associated with a first device identifier in an instant messaging group, determine, according to the first message, control-related information corresponding to at least a second device associated with a second device identifier in the instant messaging group, generate, according to the control-related information, a device control command corresponding to the second device, transmit the device control command to the second device, and receive a second message that is sent by the second device. The second message includes a device control command execution result regarding the second device executing the device control command.

According to one or more embodiments described in this disclosure, a computer device includes processing circuitry configured to obtain a first message that is indicated as from a first device associated with a first device identifier in an instant messaging group, and send the first message to at least a second device associated with a second device identifier in the instant messaging group, so that the second device determines, according to the first message, control-related information corresponding to the second device, generates a device control command according to the control-related information, and executes the generated device control command. The processing circuitry is further configured to receive a second message that is sent by the second device. The second message includes a device control command execution result regarding the second device executing the device control command.

The details of one or more embodiments of this application are disclosed in the following accompanying drawings and description as non-limiting examples. Other features, objectives, and advantages of this application may be explicitly or implicitly illustrated in the specification, the accompanying drawings, and the claims.

BRIEF DESCRIPTION OF THE DRAWINGS

To describe the technical solutions in the embodiments of this application, the following briefly describes the accompanying drawings for describing the embodiments. The accompanying drawings in the following description merely show non-limiting embodiments of this application, and a person of ordinary skill in the art may derive other drawings and/or embodiments from these accompanying drawings.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe various aspects of this application, and are not for limiting the scope of this application.

Figure 1:
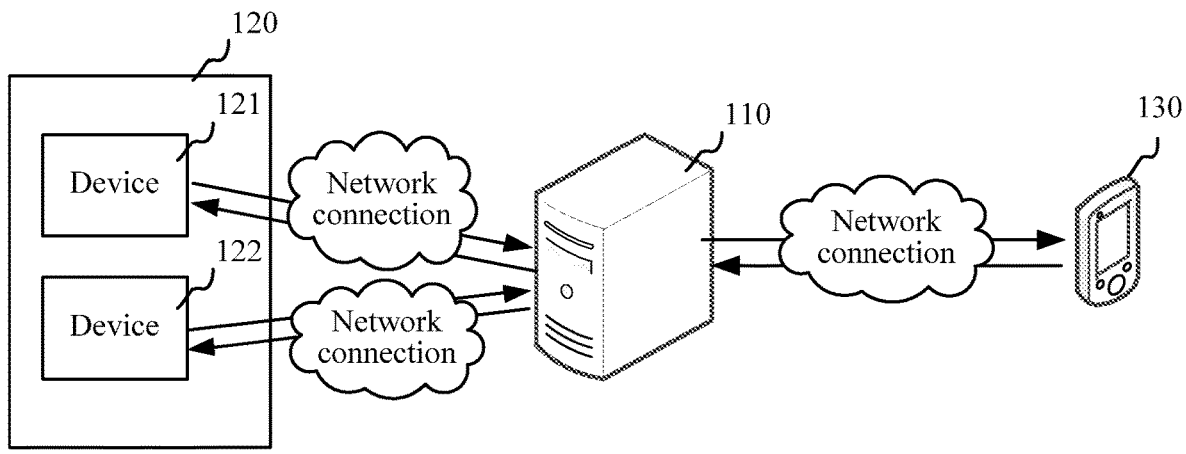
FIG. 1 is a diagram of an application environment of a device control method according to an embodiment.

FIG. 1 is a diagram of an application environment of a device control method according to an embodiment. Referring to FIG. 1, the application environment includes a server 110, one or more devices 120 (such as a first device 121 or a second device 122), and a user terminal 130. The server 110 may be an instant messaging server, an open service platform, or a server having both an instant messaging function and an open service function. The open service function of the open service platform causes the open service platform to call (e.g., request for) the service according to a request for calling a service (e.g., requesting for a service), from an access server to which the service belongs and that accesses the open service platform. The server 110 may be implemented by using an independent server or a server cluster including a plurality of physical servers. The first device 121 or the second device 122 can be a machine that can be controlled through a network, and may be a smart household device, for example, a smart refrigerator, a smart water purifier, a smart air purifier, a smart furniture, or a smart curtain. The user terminal 130 is a terminal providing a user interaction interface to interact with a user, and may be a personal computer or a mobile terminal. The mobile terminal may be, for example, at least one of a mobile phone, a tablet computer, a personal digital assistant, and a wearable device. The one or more devices 120 can be different from the user terminal 130.

Figure 2:
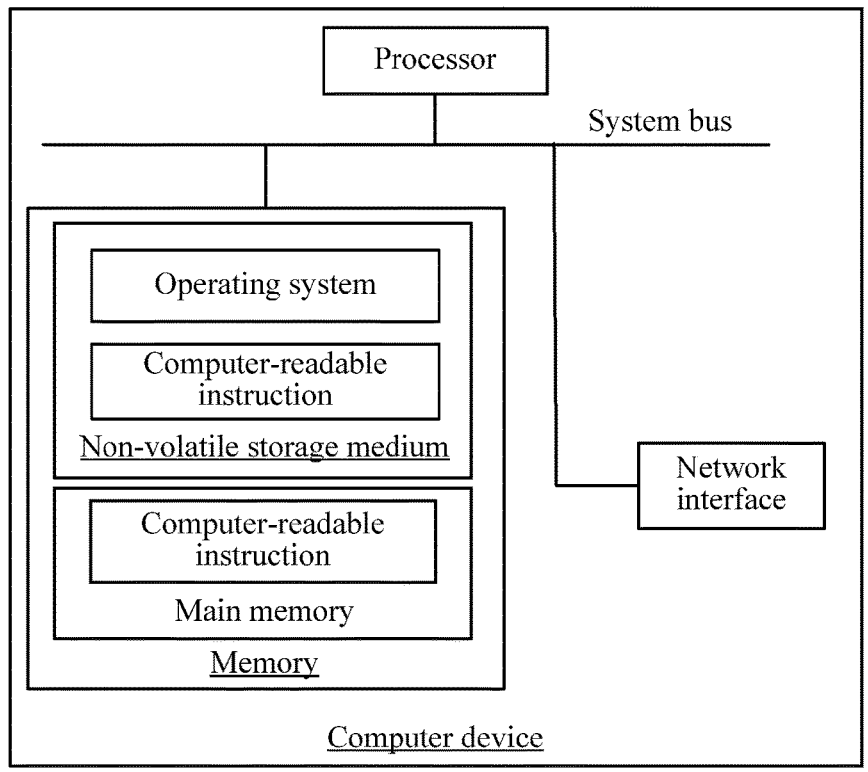
FIG. 2 is a block diagram of an internal structure of a computer device according to an embodiment.

FIG. 2 is a block diagram of an internal structure of a computer device according to an embodiment. The computer device may be the server 110 or the user terminal 130. Referring to FIG. 2, the computer device includes a processor, a memory, and a network interface that are connected by using a system bus. The memory includes a non-volatile storage medium and a main memory. The non-volatile storage medium of the computer device stores an operating system and first computer-readable instructions. When the first computer-readable instructions are executed, the processor may be caused to perform a device control method. Additionally or alternatively, the main memory of the computer device may store second computer-readable instructions. When the second computer-readable instructions are executed by the processor, the processor may be caused to perform the device control method. The network interface of the computer device is configured to communicate through a network, for example, receive and send, in some examples via push messaging, a message propagated in a group.

Figure 3:
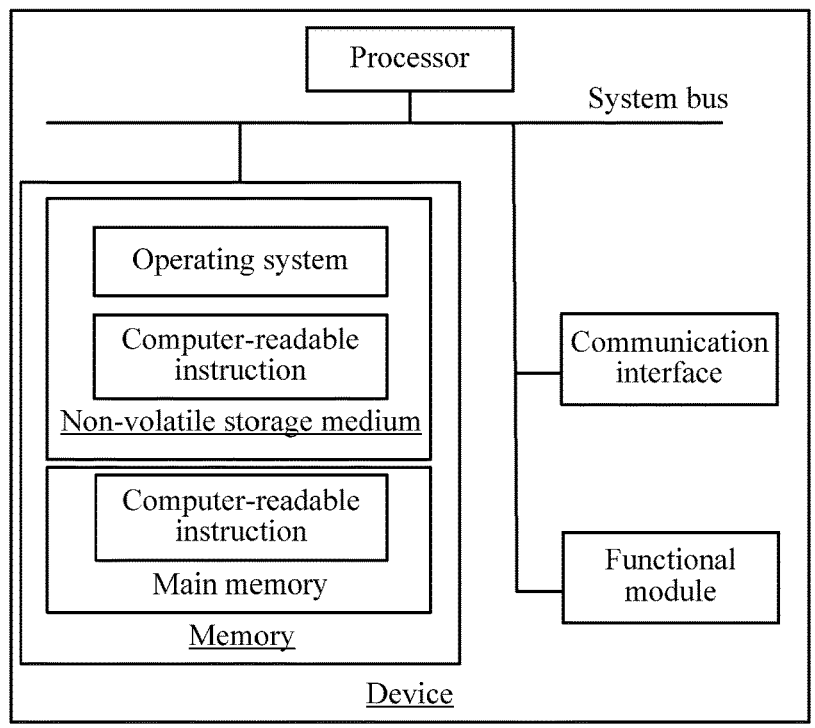
FIG. 3 is a block diagram of an internal structure of a device according to an embodiment.

FIG. 3 is a block diagram of an internal structure of a device, such as device 120 in FIG. 1, according to an embodiment. Referring to FIG. 3, the device includes a processor, a memory, a communication interface, and a functional module that are connected by using a system bus. The memory includes a non-volatile storage medium and a main memory. The non-volatile storage medium of the device 120 stores an operating system and first computer-readable instructions. When the first computer-readable instructions are executed, the processor may be caused to perform a device control method applicable to the device. The main memory of the device may store second computer-readable instructions. When the second computer-readable instructions are executed by the processor, the processor may be caused to perform a device control method. The communication interface of the device is configured to connect to a server (e.g., the server 110 in FIG. 1) for communication, for example, send or receive a message. The communication interface may be further configured to connect to a user terminal (e.g., the user terminal 130 in FIG. 1). The communication interface may be a network interface or a point-to-point communication interface. The point-to-point communication interface may be, for example, a Bluetooth interface or a near field communication (NFC) interface. The device may be an independent device or may be a combined device.

A person skilled in the art may understand that the structures shown in FIG. 2 and FIG. 3 are merely block diagrams of a part of structure related to the solutions in this application, and do not constitute any limitation to a server or a device to which the solutions in this application are applied. Specifically, the server or the device may include more or fewer components than those shown in the figures, or some components may be combined, or a different component deployment may be used.

Figure 4:
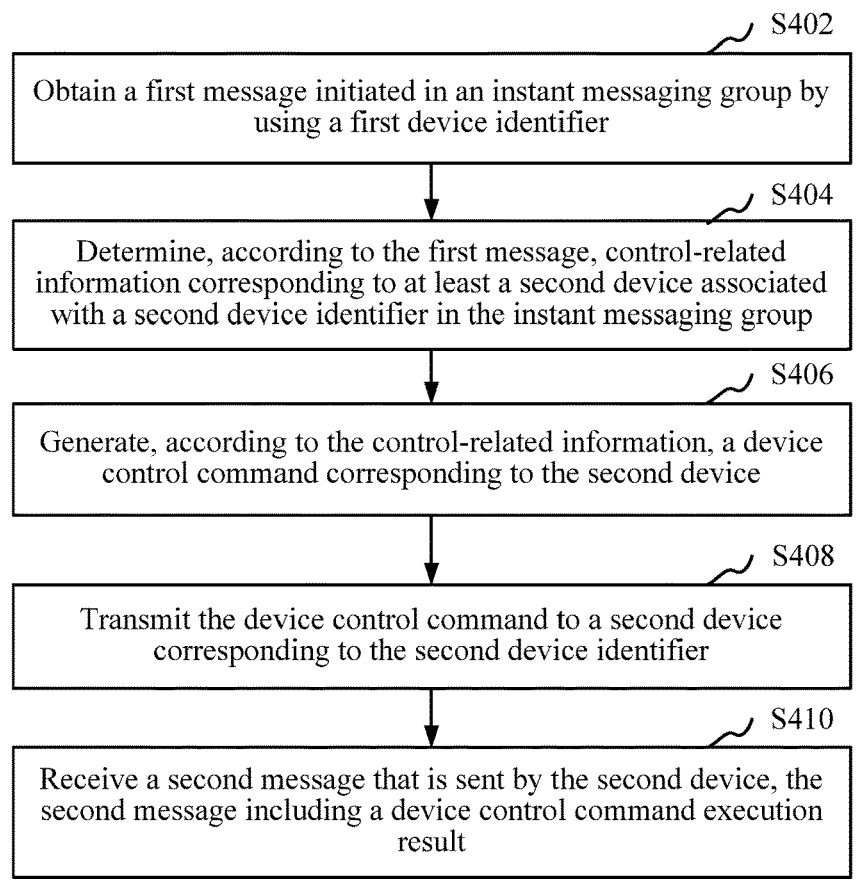
FIG. 4 is a flowchart of a device control method according to an embodiment.

As shown in FIG. 4, in an embodiment, a device control method is provided. The device control method may be applied to the server 110 or the user terminal 130 in FIG. 1. This embodiment is described by using an example in which the method is applied to the server 110 in FIG. 1. Referring to FIG. 4, the device control method specifically includes the following steps.

S402. Obtain a first message initiated in an instant messaging group by using a first device identifier. In some embodiments, the first message that is indicated as from a first device associated with the first device identifier in the instant messaging group can be obtained.

The instant messaging group is a set of identifiers of instant messaging objects. The identifier of each instant messaging object in the instant messaging group may be referred to as a group member. Each group member may send a message to another group member in the instant messaging group. The message may be a text message, a voice message, a picture message, or a text picture mixed message. The first message is a message initiated in the instant messaging group by using the first device identifier. The first message may be initiated regularly when a particular event is initiated or detected. The particular event may be an event of an environment change, for example, a change in environment temperature, environment humidity, or environment luminance.

In one embodiment, a device is used as an instant messaging object, and a device identifier identifying the device is added to the instant messaging group. One instant messaging group can include two or more device identifiers. The device identifiers in the instant messaging group may all be bound to the same user identifier. A user identifier is used to identify a user. The user may be a natural person or an entity. The user identifier may be an instant messaging user identifier. The instant messaging group may be created by an instant messaging client to which the user logs in using the user identifier.

The first device identifier is a device identifier in the instant messaging group. The first device identifier is used to identify a first device. The first device may log in to a server or a service provided by the server by using the first device identifier, and the server may receive the first message initiated by the first device in the instant messaging group to which the first device identifier belongs. All the device identifiers in the instant messaging group may be uniquely bound to the same user identifier. In this case, a message initiated by using the device identifiers in the instant messaging group is to be propagated in the same instant messaging group.

S404. Determine, according to the first message, control-related information corresponding to at least a second device associated with a second device identifier in the instant messaging group.

The control-related information is information related to device control. In an embodiment, the control-related information includes at least one of sensor perception information, device execution action description information, environment description information generated according to the sensor perception information, time information, and location information. The control-related information corresponding to the at least a second device associated with a second device identifier in the instant messaging group includes information related to control at least the second device corresponding to the second device identifier.

For example, the sensor perception information may be temperature, humidity, PM2.5 concentrations (particles), or luminance. The device execution action description information may be device startup, device shutdown, a device reporting a status, a device entering a particular running mode, or the like. The environment description information generated according to the sensor perception information may be an environment pollution degree, comfort, an environment luminance level, or the like. The time information may be an absolute time or a relative time. The absolute time may be, for example, 6 p.m., and the relative time may be, for example, half an hour later. The location information may be, for example, a living room or a bedroom.

In an embodiment, the server may directly extract, from the first message, the control-related information corresponding to at least the second device associated with the second device identifier in the instant messaging group. In an embodiment, the server may perform semantic analysis on the first message, to obtain the control-related information corresponding to at least the second device associated with the second device identifier in the instant messaging group.

S406. Generate, according to the control-related information, a device control command corresponding to the second device.

The device control command corresponding to the second device is a control command used to control the second device corresponding to the second device identifier. The same control-related information may generate different device control commands for different second devices.

In an embodiment, the server may query, according to mapping relationships between the device identifiers, the control-related information, and the device control command, a device control command to which the control-related information and the second device identifier are mapped.

S408. Transmit the device control command to the second device corresponding to the second device identifier.

In an embodiment, the server may transmit the device control command to the second device through a communication channel of the instant messaging group between the server and the second device corresponding to the second device identifier. In an embodiment, the server may transmit the device control command to the second device through a signaling channel between the server and the second device corresponding to the second device identifier, where the signaling channel is different from the communication channel of the instant messaging group.

S410. Receive a second message that is sent by the second device, the second message including a device control command execution result regarding the second device executing the device control command.

The device control command execution result is data representing a result generated after the device control command is executed, for example, device startup, device shutdown, function enabling, function disabling, a device running status, perception data obtained after the device control command is executed, or an execution time of the device control command.

In an embodiment, after receiving the device control command, the second device may execute the device control command, to obtain the corresponding device control command execution result. The second device may generate the second message according to the device control command execution result, and transmit the second message to the server through the communication channel of the instant messaging group; and the server receives the second message. The server may further send the second message to the first device and a user terminal via push messaging.

In an embodiment, the second device may directly encapsulate the device control command execution result into the second message. In an embodiment, the second device may encapsulate the device control command execution result into the second message after converting the device control command execution result into a user-recognizable form.

In an embodiment, the second device may generate, according to a user-specific attribute corresponding to the user identifier, the second message including the device control command execution result. The user-specific attribute is an attribute distinguishing a user from one or more other users. The user-specific attribute may include, for example, a gender, a name, age, a family status, an occupation, or a hobby label.

According to the device control method, the first device identifier and the second device identifier belong to the same instant messaging group. After the first device corresponding to the first device identifier initiates the first message in the instant messaging group, the first device or a server may determine, based on the first message, the control-related information corresponding to at least a second device associated with a second device identifier in the instant messaging group, generate the device control command according to the control-related information, and transmit the device control command to the second device. The second message including the device control command execution result is shared through the instant messaging group after the second device executes the device control command. Based on the instant messaging group, devices belonging to the same instant messaging group may be automatically controlled by using an instant messaging message mechanism without user participation, thereby greatly improving the device control efficiency.

Figure 5:
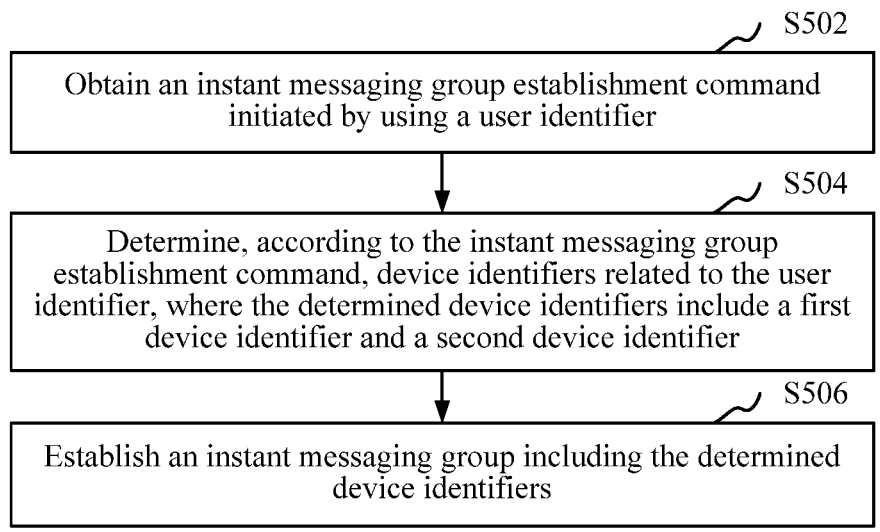
FIG. 5 is a flowchart of steps of establishing an instant messaging group according to an embodiment.

As shown in FIG. 5, in an embodiment, the device control method further includes steps of establishing the instant messaging group. The steps of establishing the instant messaging group may be performed before S402. Referring to FIG. 5, the steps of establishing the instant messaging group specifically include the following steps.

S502. Obtain an instant messaging group establishment command initiated by using the user identifier. In some embodiments, the instant messaging group establishment command is indicated as from a user associated with the user identifier.

Using the user identifier can correspond to using a user terminal logged in to a server or a service by using the user identifier. The instant messaging group establishment command is a command used to establish an instant messaging group. The user terminal may initiate the instant messaging group establishment command by using an instant messaging client that runs on the user terminal, where the instant messaging client is logged in by using the user identifier. Alternatively, the user terminal may initiate the instant messaging group establishment command by using a web page accessed by using the user identifier on the user terminal. The server may obtain the instant messaging group establishment command initiated by the user terminal.

S504. Determine, according to the instant messaging group establishment command, device identifiers related to the user identifier, where the determined device identifiers include the first device identifier and the second device identifier.

The device identifiers related to the user identifier may be device identifiers having a binding relationship with the user identifier, or may be identifiers of devices having a connection relationship with the instant messaging client that has been logged in by using the user identifier. The connection relationship may be a network connection relationship or a point-to-point connection relationship. The network connection relationship may be a wireless network connection relationship. The point-to-point connection relationship may be a Bluetooth connection relationship or a near field communication (NFC) connection relationship.

S506. Establish the instant messaging group including the determined device identifiers.

In an embodiment, the server may establish the instant messaging group including the determined device identifiers. In an embodiment, the user terminal may request the server to establish the instant messaging group including the determined device identifiers. In an embodiment, the instant messaging group may correspond to the user identifier. In an embodiment, the instant messaging group may include the user identifier.

In the foregoing embodiments, the related device identifiers can be established into the instant messaging group by using the user identifier, and devices therein can be automatically controlled based on the instant messaging group, thereby improving the device convenience and efficiency.

In an embodiment, step S502 includes obtaining the instant messaging group establishment command initiated by the instant messaging client logged in by using the user identifier. Step 504 includes obtaining device identifiers specified by the instant messaging group establishment command, where when the instant messaging client initiates the instant messaging group establishment command, the terminal that executes the instant messaging client and devices corresponding to the specified device identifiers can be connected to the same wireless network.

In an embodiment, a user may log, by using the user identifier, in to the instant messaging client running on the user terminal, and triggers, by using a triggering operation, the instant messaging client to establish a group. The user terminal can obtain the user identifier used by the instant messaging client for establishing the instant messaging group.

In an embodiment, the user terminal may obtain device identifiers of devices that are connected to the same wireless network as the terminal executing the instant messaging client when the instant messaging client establishes the group, and may display the obtained device identifiers on an interface. The user may select, from the obtained device identifiers according to the displayed interface, device identifiers to be included in a to-be-established group. It may be understood that the device identifiers selected by the user are device identifiers specified by the grouping operation, and when the instant messaging client establishes the group, the terminal executing instant messaging client and the devices corresponding to the specified device identifier connect to the same wireless network.

In this embodiment, the device identifiers of the devices that are connected to the same wireless network as the terminal executing the instant messaging client, and the user identifier used for login when the instant messaging client establishes the group are used together to establish a group. Based on this group, the user may centrally control devices in the group by sending a group message, thereby improving the control efficiency.

In an embodiment, the device control method further includes determining, according to the second message, control-related information corresponding to the first device associated with the first device identifier, generating, according to the control-related information corresponding to the first device identifier, a device control command corresponding to the first device, transmitting the device control command corresponding to the first device corresponding the first device identifier, and receiving a third message that is sent by the first device in the instant messaging group and that includes a device control command execution result. These steps may be specifically performed after S410.

In this embodiment, the first device may continue to be controlled based on the second message that is sent by the second device in the instant messaging group and that includes the device control command execution result. Device automatic control can be implemented based on message sharing between all devices in the instant messaging group.

Figure 6:
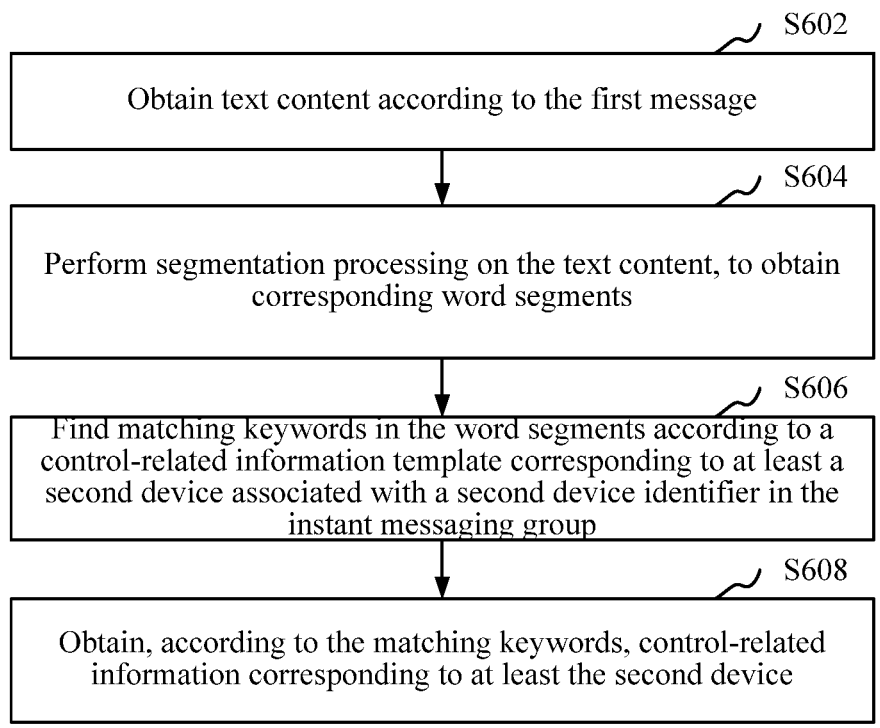
FIG. 6 is a flowchart of steps of determining, according to a first message, control-related information corresponding to at least a second device in an instant messaging group according to an embodiment.

As shown in FIG. 6, in an embodiment, step S404 includes the following steps.

S602. Obtain text content according to the first message.

Specifically, when the first message is a text message, the server may directly extract the text content from the first message. When the first message is a voice message, the server may perform speech recognition on the voice message, to obtain the corresponding text content.

S604. Perform segmentation processing on the text content, to obtain corresponding word segments.

The word segments are results obtained through the segmentation, and may include one or more characters. The server may specifically perform segmentation processing on text content of a message by using a segmentation method such as a character matching-based method or a statistics-based method, to obtain corresponding word segments.

S606. Find matching keywords in the word segments according to a control-related information template corresponding to at least a second device associated with a second device identifier in the instant messaging group.

Each device identifier in the instant messaging group corresponds to one or more control-related information templates. The control-related information template can be used as a character constraint obeyed by the control-related information. The character constraint includes whether a specified character, a specified quantity of characters, a specified character location, a specified inter-character relationship, and the like exist.

For example, if a device is a smart air conditioner, corresponding control-related information may be temperature, a corresponding control-related information template may be "temperature:" +number, "temperature is" +number, "humidity:" +number, "humidity is" +number, "the current temperature is" +number, "the target temperature is" +number, or the like, and The matching keywords may be, for example, "the current temperature is 20" or "the target temperature is 25".

S608. Obtain, according to the matching keywords, the control-related information corresponding to the at least the second device associated with a second device identifier.

Specifically, the server may determine semantics of the first message according to the matching keywords, and therefore, convert the matching keywords into the control-related information according to the determined semantics. The control-related information is normalized information. Normalization specifically includes normalization of semantic types and normalization of values. The normalized control-related information can be converted into control-related information.

Further, when performing step S406, the server may convert, according to a device control command protocol corresponding to the second device identifier, the control-related information into a device control command that can be recognized and executed by the second device.

In the foregoing embodiment, segmentation is performed on the text content of the first message, and the word segments obtained after the segmentation are recognized, to intelligently analyze the control-related information in the first message, and generate the device control command based on the control-related information. The devices in the instant messaging group can be automatically controlled by actively using a message propagated in the instant messaging group, so that the device control is more efficient and convenient.

In an embodiment, the device control method further includes inputting the control-related information into a machine learning model corresponding to the corresponding second device identifier. This step may be performed after S404. When the machine learning model outputs a result indicating executing no action in response to the first message, processing on the control-related information is stopped. When the machine learning model outputs a result indicating executing an action in response to the first message, step S406 can further include generating, according to the result from the machine learning model indicating to perform an action, the device control command corresponding to the second device identifier.

Stopping processing the control-related information means that the step of generating, according to the control-related information, the device control command corresponding to the second device is no longer performed, and the corresponding device control command is thus no longer transmitted to the second device corresponding to the second device identifier. The machine learning model may be a neural network model, or a regression model, or the like. The machine learning model may be obtained by training user behavior data. The user behavior data may correspond to the user identifier corresponding to the instant messaging group.

The control-related information may be input into the machine learning model in an agreed format during training. The machine learning model outputs the result indicating to execute an action or the result indicating not to execute an action. The result indicating to execute an action may represent performing different actions, and an action parameter may further be given to each action. Different actions may be, for example, device startup, device shutdown, or entering a particular mode for running. The action parameter may be, for example, a parameter for regularly executing an action or a parameter indicating to execute an action when an environment meets a condition.

In the foregoing embodiment, a mapping relationship between the control-related information and whether to execute an action can be learned by using a learning capability of the machine learning model. In this way, the machine learning model can accurately determine the corresponding device control command based on the input control-related information, thereby implementing automatic, intelligent, accurate, and highly efficient device control.

In an embodiment, the device control method further includes obtaining a user-specific attribute corresponding to the user identifier, adjusting content of the second message according to the user-specific attribute, where the adjusted second message includes the device control command execution result, and sending the adjusted second message via push messaging to the instant messaging client executed on a terminal and corresponding to the user identifier.

The user-specific attribute is an attribute distinguishing a user from one or more other users, such as a gender, a name, age, a family status, an occupation, or a hobby label. The server may pre-collect the user-specific attribute corresponding to the user identifier, and adjust the content of the second message according to the user-specific attribute after receiving the second message. After the content is adjusted, the second message still includes the device control command execution result.

For example, it is assumed that the second device is an air purifier, and the corresponding device control command execution result is that the device is successfully started, the second message may be a text message, and the text content is: "The air purifier is successfully started". If the user-specific attribute is that the gender is male, the second message may be converted into a female voice message; or the text content of the second message may be converted into a female voice message after the text content of the second message is changed into a lady's tone (for example "I am the air purifier, I already woke up"). In some embodiments, an additional sound effect may be added. Different devices may use different sources of human sound materials to synthesize the materials into voice messages, and so on.

In the foregoing embodiments, the content of the second message is adjusted with reference to the user-specific attribute, and the adjusted second message is pushed to the instant messaging client. Therefore, a user can be notified of statuses of all devices in the instant messaging group in time in a manner meeting a personalized requirement of the user, thereby improving the convenience of device control.

In an embodiment, the device control method further includes analyzing a targeted object of the first message. This step may be specifically performed before S404. When the targeted object is at least one device identifier in the instant messaging group, step S406 is performed.

The targeted object of the first message is an object that needs to receive the first message. The targeted object of the first message may be a user identifier or a device identifier. When the targeted object is a user identifier, the server may not perform step S406 and subsequent steps, but propagate the first message in the instant messaging group.

In an embodiment, the server may directly extract the targeted object of the first message from the first message. In an embodiment, the server may recognize a dedicated indication from the first message, and determine the targeted object of the first message according to the dedicated indication.

The dedicated indication may be, for example, "@". For example, if the first message is "@refrigerator startup", the targeted object of the first message is a device named refrigerator; if the first message is "@ID9527 startup", the targeted object of the first message is a device having a device identifier of "ID9527"; and if the first message is "@Master, you need to buy some vegetables", the targeted object of the first message is a user identifier.

In an embodiment, the server may analyze semantics of the first message, and therefore, searches the instant messaging group for a member related to the first message, to serve as the targeted object of the first message. In an embodiment, the server may further analyze context according to a plurality of messages propagated in the instant messaging group, to determine the targeted object of the first message.

In the foregoing embodiment, the targeted object of the first message may be determined through self-analysis, thereby generating a device control command corresponding to the targeted object of the first message, to control a corresponding device, thereby improving the device control accuracy.

Figure 7:
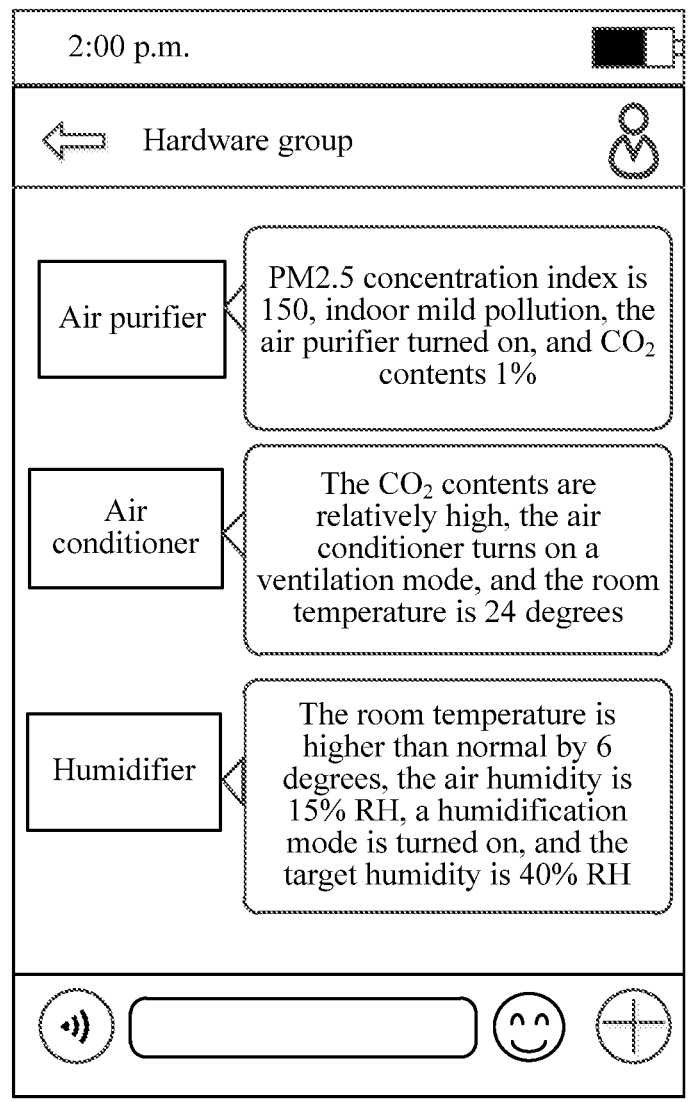
FIG. 7 is a screenshot of an instant messaging client when a device control method is implemented in a specific application scenario according to an embodiment.

A principle of the device control method is described below by using a specific application scenario. Referring to FIG. 7, a user may add an air purifier, an air conditioner, and a humidifier to an instant messaging group. The air purifier, the air conditioner, and the humidifier may regularly share messages. The messages may include perception information, device execution action description information, and environment description information. The perception information may be, for example, a PM2.5 concentration index and $CO_2$ content. The device execution action description information may be, for example, turning on the air purifier. The environment description information may be, for example, indoor mild pollution.

For a message shared by the air purifier, if it is recognized that information related to the air conditioner is $CO_2$ content, a device control instruction that is for the air conditioner and that is used to set the air conditioner to a ventilation mode is generated, so that the air conditioner executes the device control instruction, and a corresponding device control command execution result is that the air conditioner turns on the ventilation mode. The air conditioner further detects that the perception information is room temperature 24 degrees. The air conditioner shares a message including the device control command execution result and the perception information in the instant messaging group. Further, a device control command for the humidifier may be generated based on the message sent by the air conditioner, so that a humidification mode of the humidifier is turned on, and sets the target humidity to 40% RH (relative humidity).

Figure 8:
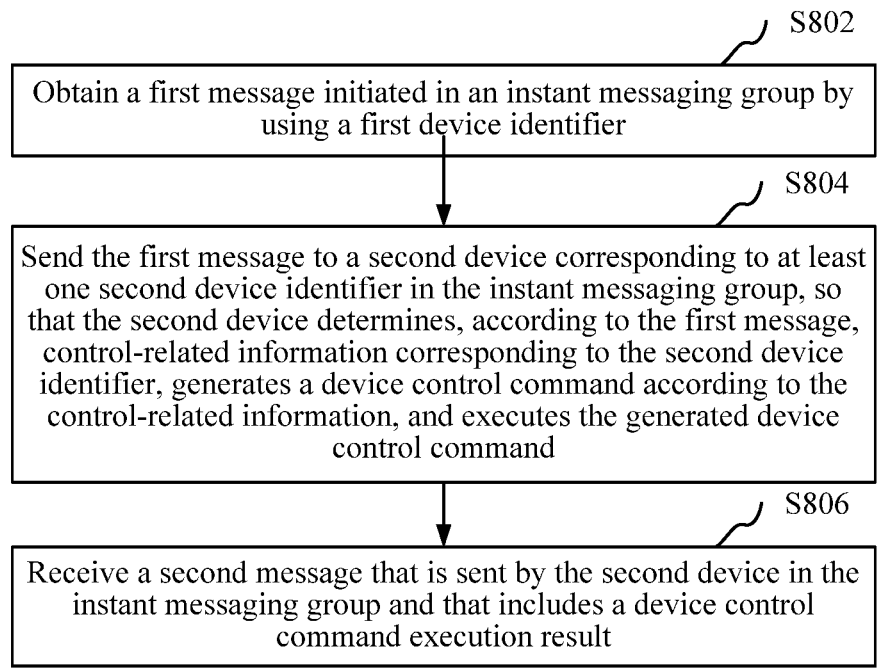
FIG. 8 is a flowchart of a device control method according to another embodiment.

As shown in FIG. 8, in an embodiment, another device control method is provided. The example shown in FIG. 8 may be implemented in conjunction with the embodiments of FIG. 4 to FIG. 6. The device control method may be applied to the server 110 or the user terminal 130 in FIG. 1. This embodiment is described by using an example in which the method is applied to the server 110 in FIG. 1. Referring to FIG. 8, the device control method specifically includes the following steps.

S802. Obtain a first message initiated in an instant messaging group by using a first device identifier. In some embodiments, a first message that is indicated as from a first device associated with a first device identifier in an instant messaging group can be received or obtained.

S804. Send the first message to a second device corresponding to a second device identifier in the instant messaging group, so that the second device determines, according to the first message, control-related information corresponding to the second device associated with the second device identifier, generates a device control command according to the control-related information, and executes the generated device control command.

S806. Receive a second message that is sent by the second device in the instant messaging group and that includes a device control command execution result.

According to the device control method, the first device identifier and the second device identifier belong to the same instant messaging group. After a first device corresponding to the first device identifier initiates the first message in the instant messaging group, the first device or a server may determine, based on the first message, that the first message is to be sent to the second device. The second device after receiving the first message can determine the control-related information corresponding to the second device associated with the second device identifier in the instant messaging group, generates the device control command according to the control-related information, and executes the generated device control command. The second device may send a second message including the device control command execution result that is shared through the instant messaging group after the second device executes the device control command. Based on the instant messaging group, devices belonging to the same instant messaging group may be automatically controlled by using an instant messaging message mechanism without user participation, thereby greatly improving the device control efficiency.

In an embodiment, the device control method further includes sending the second message to the first device corresponding to the first device identifier, so that the first device determines, according to the second message, control-related information corresponding to the first device identifier, generates a device control command according to the control-related information, and executes the generated device control command. The device control method may further include receiving a third message that is sent by the first device in the instant messaging group and that includes a device control command execution result regarding the first device executing the corresponding device control command.

In an embodiment, the device control method further includes: obtaining a user-specific attribute corresponding to a user identifier, adjusting content of the second message according to the user-specific attribute, where the adjusted second message includes the device control command execution result, and sending the adjusted second message via push messaging to a terminal that runs an instant messaging client corresponding to the user identifier.

In an embodiment, the device control method further includes analyzing a targeted object of the first message, and, when the targeted object corresponds to a device identifier in the instant messaging group, performing the step of sending the first message to the second device in the instant messaging group. These steps may be specifically performed before S804.

In an embodiment, the device control method further includes obtaining an instant messaging group establishment command initiated by using the user identifier, determining, according to the instant messaging group establishment command, device identifiers related to the user identifier, where the related device identifiers include the first device identifier and the second device identifier, and establishing an instant messaging group including the determined device identifiers. These steps may be specifically performed before S802.

In an embodiment, the step of obtaining the instant messaging group establishment command initiated by using the user identifier includes obtaining the instant messaging group establishment command initiated by the instant messaging client that is logged in by using the user identifier. In an embodiment, the step of determining, according to the instant messaging group establishment command, the device identifiers related to the user identifier includes obtaining the device identifiers specified by the instant messaging group establishment command, where when the instant messaging client initiates the instant messaging group establishment command, a terminal that runs the instant messaging client and devices corresponding to the specified device identifiers connect to the same wireless network.

In an embodiment, the control-related information includes at least one of sensor perception information, device execution action description information, environment description information generated according to the sensor perception information, time information, and location information.

In an embodiment, the second device may obtain text content according to the first message, perform segmentation processing on the text content, to obtain corresponding word segments, find matching keywords in the word segments according to a control-related information template corresponding to at least a second device associated with a second device identifier in the instant messaging group, and obtain, according to the matching keywords, the control-related information corresponding to at least the second device.

In an embodiment, the second device may input the control-related information into a machine learning model corresponding to the second device. When the machine learning model outputs a result indicating not to execute an action, stop processing the control-related information; and when the machine learning model outputs a result indicating execution of an action. The second device may generate, according to the control-related information, the device control command corresponding to the second device identifier, including generating, according to the result indicating execution of an action, the device control command corresponding to the second device.

According to another aspect, with the development of computer technologies and the improvement of people's living standards, people are increasingly relying on the Internet to provide a variety of services. Providing people with various services through various servers has been more widely applied to people's life, bringing great convenience to people's life. However, in a related service request mode, when requesting for the service from a server, a user needs to log in to a user terminal by using a user identifier, and then perform related operations on the user terminal to request for the service. The operations are complex, resulting in low processing efficiency with respect to requesting for services.

Figure 9:
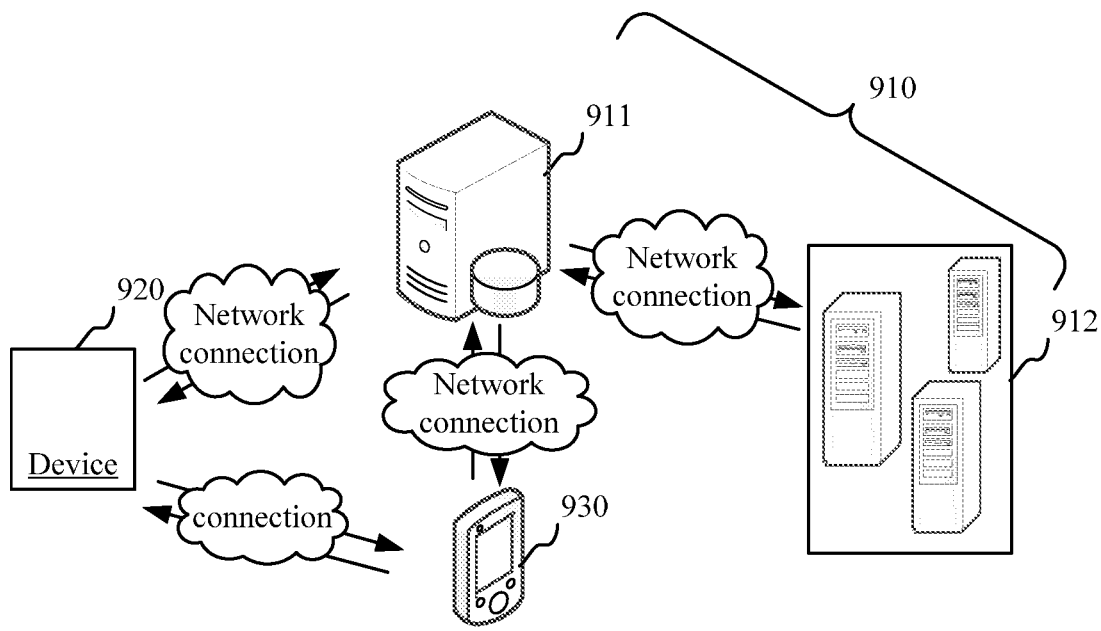
FIG. 9 is a diagram of an application environment of a device control method according to another embodiment.

Based thereupon, the device control method in the foregoing embodiment may include service request steps, to improve the efficiency of making service requests by performing the service request steps. The service request steps include a service request step applicable to the server and a service request step applicable to the user terminal. FIG. 9 is a diagram of an application environment of a device control method that includes service request steps according to an embodiment.

Referring to FIG. 9, the diagram of the application environment includes a server 910, a device 920, and a user terminal 930. The server 910 includes an open service platform 911 and a service server 912. The device 920 (e.g., a user side device or simply referred to as a user device) may be connected to the open service platform 911 through a network, and may also be connected to the user terminal 930 through a network or the Bluetooth. The user terminal 930 is connected to the open service platform 911 through a network. The service server 912 may access the open service platform 911 through a network. The device 920 is a computer device that can replace the user terminal 930 or coordinate with the user terminal 930 to provide a service. In some embodiments, the device 920 is a computer device different from the user terminal 930, for example, an assistant-type device or a tool-type device. The open service platform 911 includes one or more servers, and is configured to connect to the service server 912, provide an access service for the device 920 and the user terminal 930, and interact with the device 920, the user terminal 930, and the service server 912.

The device 920 may initiate, to the user terminal 930, a service request for requesting for a specified service. Then the user terminal 930 sends a current login user identifier and a device identifier collaborative service request to the open service platform 911. When the device 920 has, by using the corresponding device identifier, a permission that is for requesting for the specified service and that corresponds to the user identifier, the device 920 may request for the specified service by using the service server 912 to which the specified service belongs, and obtain a corresponding service request result. The device 920 may initiate, to the open service platform 911, the service request for requesting for the specified service. If the device 920 has, by using the corresponding device identifier, the permission that is for requesting for the specified service and that corresponds to the user identifier, the device 920 may request for the specified service by using the service server 912 to which the specified service belongs, and obtains the corresponding service request result.

Figure 10:
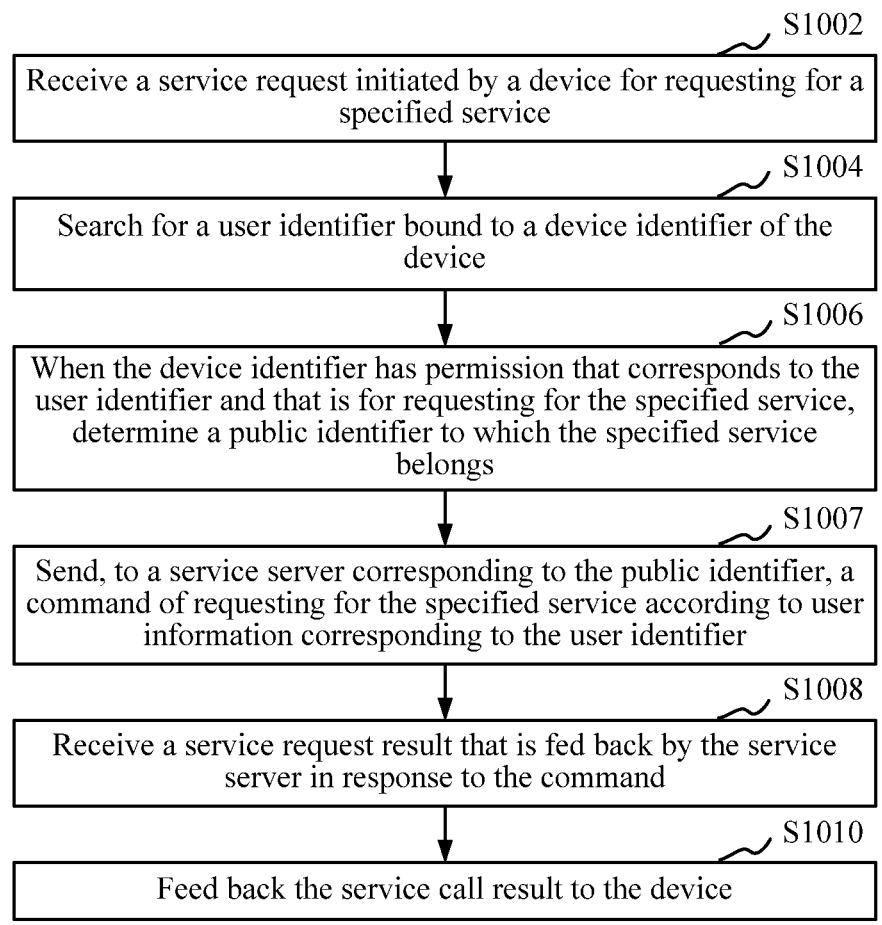
FIG. 10 is a flowchart of a service requesting method in a device control method according to another embodiment.

As shown in FIG. 10, in an embodiment, the server 910 in FIG. 9 is used as an example for description. The service request steps may include the service request step applicable to the server. The server 910 configured to perform the service request step may be specifically the open service platform 911. The service request step specifically includes the following steps.

S1002. Receive a service request initiated by a device for calling a specified service.

The service request is a request used for requesting for a service. The specified service is a specific service specified by the device that makes the request. The specified service may be, for example, a microblog post service, a mobile phone fee recharge service, or a water and electricity payment service. The specified service may be a service provided by the service server accessing the open service platform, or may be a service provided by the open service platform.

The open service platform means that a server that may be used to implement a service platform, and can provide a service by releasing to public an application programming interface or function to enable an external server to render services accessible through the open service platform. The device may be directly connected to the open service platform, and directly initiate a service request to the open service platform. Alternatively, the device may be connected to the user terminal, and initiate a service request to the user terminal, and then the user terminal sends the service request to the open service platform.

In an embodiment, the device may obtain a triggering instruction, and sends the service request to the open service platform according to the triggering instruction. The open service platform receives the service request. The triggering instruction is an instruction for triggering the service request. The service request may be triggered in a plurality of triggering manners such as a touch operation, pressing of a physical key, voice control, and a device shaking operation.

In an embodiment, the device may provide an operation entry of the service request, detect a trigger operation performed by the user on the operation entry, enter a service request page according to the detected trigger operation, trigger a corresponding triggering instruction on the service request page, and send the service request to the open service platform according to the triggering instruction. The operation entry may be an icon, a text link, a virtual button, or the like.

S1004. Search for a user identifier bound to a device identifier of the device.

The device identifier is a character string uniquely identifying the device. The device identifier may be a device number assigned by the open service platform. Each device has a different device number. A device manufacturer can register to the open service platform for device number assignment before producing a device, and the open service platform assigns a device number to the device to be produced. The device number may be, for example, "653dw128" or "3686 mg5321".

The device identifier can also include a device type identifier and a device number. The device type identifier is used to uniquely identify one type of devices. The device type may be, for example, an assistant-type device or a tool-type device. The device number is used to uniquely identify an individual device of one type of devices. For example, a device manufacturer A produces assistant-type devices B and tool-type devices C. All the assistant-type devices B have the same device type identifier, and all the tool-type devices C also have the same device type identifier, but each device B has a different device number. However, the device B and the device C may have the same device number.

For example, assuming that the device type identifier corresponding to the assistant-type device is "AD", the device type identifier corresponding to the tool-type device is "TD", and the device numbers are "001", "002", "003", and the like, the device identifiers of the assistant-type devices B may be "AD001", "AD002", or the like, and the device identifiers of the tool-type devices C may be "TD001", "TD003", or the like.

The user identifier is a character string uniquely identifying a user. The user identifier may be a user identifier used to log in to the user terminal. The user identifier used to log in to the user terminal may be specifically a social user account used to log in to a social application running on the user terminal, or may be a third-party account associated with a social user account used to log in to a social application running the user terminal. The user identifier may be bound to the device identifier. A binding relationship between the user identifier and the device identifier may be unique.

In an embodiment, after receiving the service request initiated by the device for requesting for the specified service, the open service platform may obtain the device identifier carried in the service request, and search for a user identifier having a binding relationship with the device identifier.

In an embodiment, alternatively, after receiving the service request initiated by the device for requesting for the specified service, the open service platform may search, according to the service request, the open service platform for a device identifier corresponding to the device, and then search for a user identifier having a binding relationship with the device identifier.

In an embodiment, when a device identifier of a device represents that the device is an assistant-type device, a user identifier bound to the device identifier of the device may be unique.

S1006. When the device identifier has a permission that corresponds to the user identifier and that is for requesting for the specified service, determine a public identifier to which the specified service belongs.

The public identifier may be a public service account registered on the open service platform, or may be a third-party account associated with a public service account registered on the open service platform. The public identifier is an entry through which the service server provides a service by using the open service platform. A user may follow or associate with the public identifier by using the user identifier, to call the service provided by the service server corresponding to the public identifier.

Specifically, a service request needs to be processed according to user information corresponding to the user identifier, and the user information corresponding to the identifier can be obtained after user identifier authorization succeeds. After receiving the service request initiated by the device for requesting for the specified service, and finding the user identifier that is bound to the device identifier of the device and that is used to log in to the user terminal, the open service platform needs to authenticate the permission for requesting for the specified service by the device.

In an embodiment, the open service platform stores an authorized service list that corresponds to the user identifier and that grants, to the device corresponding to the device identifier bound to the user identifier, a permission for requesting for a service. After finding the user identifier that is bound to the device identifier of the device and that is used to log in to the user terminal, the open service platform queries the authorized service list corresponding to the user identifier and the device identifier.

After finding the authorized service list, the open service platform may traverse various services in the list, to determine whether the specified service that the device requests for is in the authorized service list. If the specified service that the device requests for is in the authorized service list, it indicates that the device has the permission for requesting for the specified service. After finishing authenticating the permission for requesting for the specified service by the device, the open service platform may query affiliation between a service and a public identifier, to determine a public identifier of the specified service that the device requested.

If the specified service that the device requests for is not in the authorized service list, the device does not have the permission for requesting for the specified service, and the open service platform feeds back a notification indicating that the device cannot request for the specified service.

S1007. Send, to the service server corresponding to the public identifier, a command of calling the specified service according to the user information corresponding to the user identifier.

The user information corresponding to the user identifier is a user parameter required for requesting for the specified service. For example, when the specified service is a water and electricity payment service, a user number registered by a user to the water group is required. in another example, when the specified service is a microblog post service, a microblog account of a user is required. Specifically, a service request needs to be processed according to the user information corresponding to the user identifier. After determining the public identifier to which the specified service belongs, the open service platform may send, to the service server corresponding to the public identifier, the command of requesting for the specified service according to the user information corresponding to the user identifier.

For example, assuming that the specified service is a domestic water payment service, a water service server providing the service may register with a public service account "XX water group" on the open service platform, where "XX water group" is a public identifier to which the service belongs. After following "XX water group" by using a user identifier, a user may initiate a service request for requesting for the domestic water payment service from the water service server accessing the open service platform. After receiving the request, the open service platform instructs the water service server to request for the domestic water payment service according to the user information. Additionally or alternatively, after a permission for requesting for a service corresponding to the user identifier is granted to the device, the device may initiate the service request for requesting for the domestic water payment service from the water service server accessing the open service platform. After receiving the request, the open service platform instructs the water service server to request for the domestic water payment service according to the user information.

S1008. Receive a service request result that is fed back by the service server in response to the command.

Specifically, after receiving the command, sent by the open service platform, of requesting for the specified service according to the user information corresponding to the user identifier, the service server obtains the user information and a service parameter that are included in the command, and renders the service according to the user information and the service parameter. After processing the service request, the service server returns the service request result to the open service platform.

For example, assuming that the specified service is a broadband payment service, the user information is a broadband subscriber number, and the service parameter is a broadband type, a broadband payment amount, or the like. In some embodiments, the broadband payment service provided by the service server corresponds to processing the broadband fee payment for the broadband type associated with the broadband subscriber number.

S1010. Feed back the service request result to the device.

Specifically, after receiving the service request result that is fed back by the service server for the command, the open service platform may feed back the service request result to the device by way of a voice message, or may feed back the service request result to the device in a text form by using a service request result presentation page.

According to the device control method, a binding relationship between the device identifier and the user identifier is established, and a permission that corresponds to the user identifier and that is for requesting for the specified service may be granted to the device by using the device identifier. After the user initiates, by using the device, the service request for requesting for the specified service, if the device has, by using a corresponding device identifier, the permission that corresponds to the user identifier and that is for requesting for the specified service, the device may request for the specified service by using the service server corresponding to the public identifier to which the specified service belongs, and obtain the corresponding service request result. The device does not need to log in to the user terminal by using the user identifier to perform a series of operations to request for the service, thereby simplifying the operations, and improving the efficiency of service call.

In an embodiment, step S1006 includes obtaining service parameters specified by the service request. In some embodiments, when the obtained service parameters do not include a particular service parameter required for requesting for the specified service, the S1006 includes sending, to the device, an instruction of providing the particular service parameter. S1006 may further include receiving the particular service parameter provided by the device in response to the instruction, and sending, to the service server corresponding to the public identifier, a command of requesting for the specified service according to at least the particular service parameters and/or one or more of the obtained service parameters and the user information corresponding to the user identifier.

The service parameters are service-related parameters. For example, for the broadband payment service, the service parameters may be a broadband subscriber number, a broadband payment amount, and the like. The service parameter required for requesting for the specified service is a parameter that is necessary for requesting for the specified service. For example, for the broadband payment service, the broadband subscriber number and the broadband payment amount are necessary parameters. The open service platform may store a service parameter set that is required for requesting for a service accessing the open service platform.

Specifically, after receiving the service request, the open service platform may obtain service parameters included in the service request, and compare the obtained service parameters with all service parameters in the service parameter set required by the specified service, to sift out a missing service parameter. After sifting out the missing service parameter, the open service platform may send, to the device, an instruction of providing the missing service parameter. After receiving the instruction, the device obtains the provided service parameter, and feeds back the provided service parameter to the open service platform.

The open service platform may compare again the obtained service parameters and the provided service parameter with all the service parameters in the service parameter set required by the specified service. If any service parameter required for requesting for the specified service is still missing, the open service platform may resend, to the device, the instruction of providing the missing service parameter, until the obtained service parameters and the additionally provided service parameter match all the service parameters in the service parameter set required by the specified service. The open service platform may send, to the service server corresponding to the public identifier to which the specified service belongs, the command of requesting for the specified service according to one or more of the obtained service parameters, the provided service parameter, and the user information corresponding to the user identifier.

In this embodiment, the user may interact with the open service platform for a plurality of times through the device, to perfect the service parameters required for requesting for the specified service, thereby ensuring a successful service request, and improving the effect of the service request.

In an embodiment, step S1002 includes receiving a voice message sent by the device, performing speech recognition on the received voice message, and determining that the received voice message is the service request for requesting for the specified service. Step S1010 includes converting the service request result into an outgoing voice message, and feeding back the outgoing voice message to the device.

Specifically, the received voice message is a message triggered by the user in a sound control manner. After receiving the voice message triggered by the user, the device may send the voice message to the open service platform. The open service platform recognizes the voice message, to obtain text content corresponding to the voice message. When the text content indicates that the device intends to make a service request, the open service platform determines that the voice message is the service request for requesting for the specified service. For examples, if the text content obtained by the open service platform by recognizing the voice message is that "I want to post a microblog", the open service platform may determine that the voice message is a service request for requesting for a microblog service.

The open service platform may process a corresponding service request according to the service request, convert the service request result into an outgoing voice message after obtaining the service request result of the service request, and then feed back the outgoing voice message to the device.

In this embodiment, the user may directly exchange voice messages with the open service platform through the device, thereby enriching interaction manners, avoiding complex processes of manual operations, and improving the efficiency of making service requests.

In an embodiment, step S1006 includes determining an interaction type of the specified service, and, when the interaction type is a type of interaction that a user terminal participates in, sending an interaction page of the specified service to a user terminal that has been logged in by using the user identifier. Step 1006 may include obtaining a service parameter fed back by the user terminal through the interaction page, and sending, to the service server corresponding to the public identifier, the command of requesting for the specified service according to the service parameter and the user information corresponding to the user identifier.

Specifically, after receiving the service request and finishing authentication, the open service platform checks the interaction type corresponding to the specified service. When determining that the interaction type corresponding to the specified service is the type of interaction that a user terminal participates in, the open service platform sends the interaction page of the service to the user terminal that has been logged in by using the user identifier. After receiving the interaction page, the user terminal may display the interaction page, so that the user perfects, through the interaction page, the service parameters required to request for the specified service, and feeds back the perfected interaction page to the open service platform. After obtaining the service parameter fed back by the user terminal through the interaction page, the development service platform sends, to the service server corresponding to the public identifier to which the specified service belongs, the command of requesting for the specified service according to the service parameter and the user information corresponding to the user identifier.

In this embodiment, when the service request requires participation of the user terminal, the service parameters are perfected by using the user terminal, thereby ensuring a successful service request, and improving the effect of making service requests.

In an embodiment, the device control method further includes receiving an authorization request that is initiated by the user terminal logged in by using the user identifier and that is used to authorize the device, and obtaining, according to the authorization request, a service selected by the user terminal from a service set corresponding to the user identifier. The device control method may further include granting, in correspondence to the device identifier of the device, a permission that corresponds to the user identifier and that is for requesting for the selected service. These steps may be specifically performed before S1002.

The authorization request is a request requesting to grant permission to the device regarding making a service request. Specifically, after the user terminal logged in by using the user identifier is connected to the device, the user terminal may initiate, to the open service platform, the authorization request used to authorize the device. After obtaining the authorization request, the open service platform obtains the service that is carried in the authorization request and that is selected by the user terminal from the service set corresponding to the user identifier, and grants, in correspondence to the device identifier of the device, the permission that corresponds to the user identifier and that is for requesting for the selected service. After finishing the authorization, the open service platform correspondingly records the user identifier, the device identifier, and the authorized service.

In this embodiment, the device can request for the selected service only after the permission that corresponds to the user identifier and that is for requesting for the selected service is granted to the device, thereby ensuring the security of the user information and the service call.

In an embodiment, before the receiving an authorization request that is initiated by the user terminal logged in by using the user identifier and that is used to authorize the device, the device control method further includes receiving a binding request initiated after the user terminal logged in by using the user identifier is connected to an assistant-type device, and, when the user identifier does not have a binding relationship with any assistant-type device identifier and the device identifier of the device does not have a binding relationship with any user identifier, establishing a binding relationship between the user identifier and the device identifier of the device.

The assistant-type device is a device that can replace the user terminal to request for a service after the device is authorized by the user. Specifically, after the terminal is connected to the assistant-type device, the terminal may send the binding request carrying the user identifier and the device identifier to the open service platform. After receiving the binding request, the open service platform checks whether the assistant-type device identifier having a binding relationship with the user identifier exists and whether the user identifier having a binding relationship with the device identifier exists. When the open service platform does not found any assistant-type device identifier having a binding relationship with the user identifier and any user identifier having a binding relationship with the device identifier, the open service platform establishes, according to the binding request, a unique binding relationship between the user identifier and the device identifier that are carried in the binding request, and correspondingly records the established binding relationship.

In this embodiment, a unique binding relationship between a device and a user is established by using the user identifier and the device identifier, thereby avoiding a problem that after one user is bound to a plurality of assistant-type devices, service requests are simultaneously made by the plurality of assistant-type devices, and ensuring the stability of making service requests.

Figure 11:
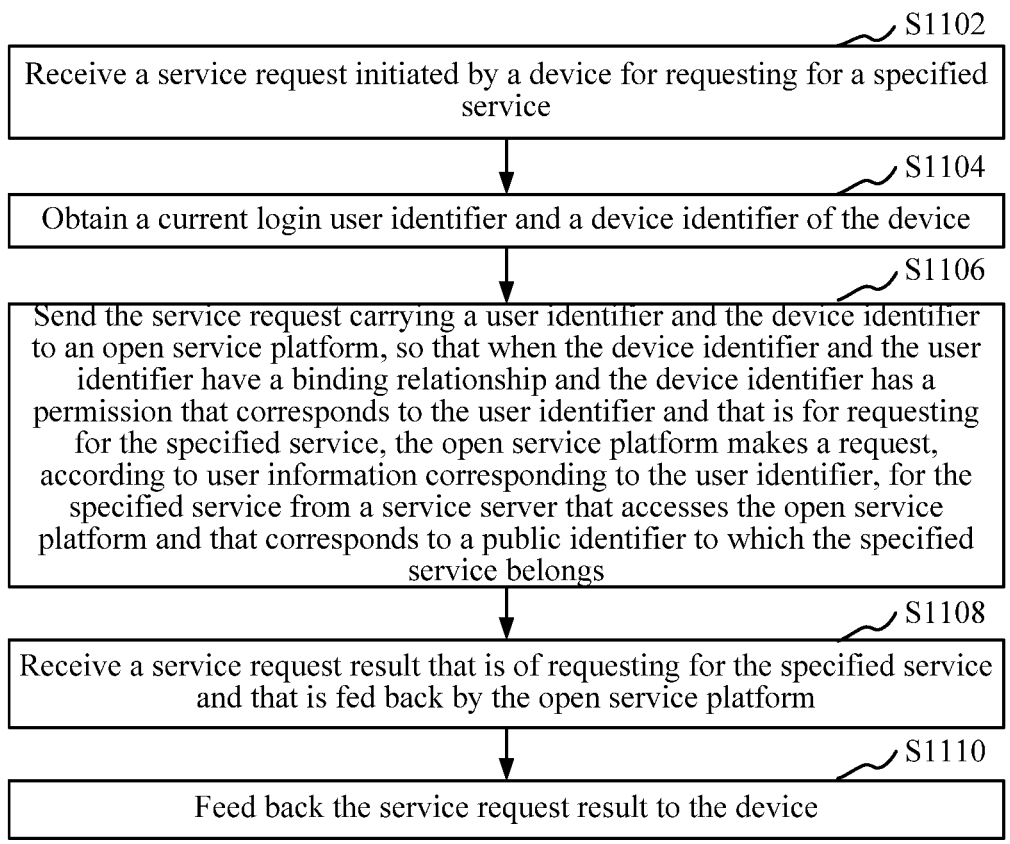
FIG. 11 is a flowchart of a service requesting method in a device control method according to another embodiment.

As shown in FIG. 11, in an embodiment, the user terminal 930 in FIG. 9 is used as an example for description. The service request step may further include a service request step applicable to the user terminal. The service request step specifically includes the following steps.

S1102. Receive a service request initiated by a device for requesting for a specified service.

Specifically, the device may establish a connection to the user terminal in a near field communication manner, a Bluetooth communication manner, or a wireless network communication manner. After establishing a connection to the user terminal, the device may initiate, to the user terminal, the service request for requesting for the specified service. The user terminal receives the service request.

S1104. Obtain a current login user identifier and a device identifier of the device.

Specifically, after receiving the service request initiated by the device for requesting for the specified service, the user terminal may obtain the device identifier carried in the service request. Alternatively, after receiving the service request initiated by the device for requesting for the specified service, the user terminal may locally search, according to the service request, for the device identifier corresponding to the device.

S1106. Send the service request carrying a user identifier and the device identifier to an open service platform, so that when the device identifier and the user identifier have a binding relationship and the device identifier has a permission that corresponds to the user identifier and that is for requesting for the specified service, the open service platform makes a request, according to user information corresponding to the user identifier, for the specified service from a service server that accesses the open service platform and that corresponds to a public identifier to which the specified service belongs.

Specifically, after obtaining the current login user identifier and the device identifier of the device, the user terminal may send the user identifier and the device identifier together with the service request to the open service platform. After receiving the service request, the open service platform may search a record of the binding relationship between the user identifier and the device identifier for whether the user identifier and the device identifier that are carried in the service request have a binding relationship. When the user identifier and the device identifier that are carried in the service request do not have a binding relationship, the open service platform may query an authorized service list corresponding to the user identifier and the device identifier.

After finding the authorized service list, the open service platform may determine whether the specified service is in the authorized service list. If the specified service is in the authorized service list, it indicates that the device has a permission for requesting for the specified service, and the open service platform sends, to the service server corresponding to the public identifier to which the specified service belongs, a command of requesting for the specified service according to the user information corresponding to the user identifier. If the specified service is not in the authorized service list, it indicates that the device does not have the permission for requesting for the specified service, and the open service platform feeds back, to the user terminal, a notification indicating that the device cannot request for the specified service.

S1108. Receive a service request result that is of requesting for the specified service and that is fed back by the open service platform.

Specifically, after receiving the command, sent by the open service platform, of calling the specified service according to the user information corresponding to the user identifier, the service server may obtain the user information and a service parameter that are included in the command, and request for the service according to the user information and the service parameter. After processing the service request, the service server returns the service request result to the open service platform. After receiving the service request result returned by the service server, the open service platform feeds back the service request result to the user terminal.

S1110. Feed back the service request result to the device.

Specifically, after receiving the service request result fed back by the open service platform, the user terminal may feed back the service request result to the device by way of a voice message, or may feed back the service request result to the device in a text form by using a service call result presentation page.

According to the foregoing device control method, when the service request initiated by the device for requesting for the specified service is locally received, the current login user identifier and the device identifier of the device together with the service request are sent to the open service platform. If the device has a binding relationship with the user identifier by using a corresponding device identifier, and has the permission that corresponds to the user identifier and that is for requesting for the specified service, the device may request for the specified service by using the service server corresponding to the public identifier to which the specified service belongs, and obtain the corresponding service request result. The device does not need to log in to the user terminal by using the user identifier to perform a series of operations to request for the service, thereby simplifying the operations, and improving the efficiency of making service requests.

In an embodiment, the device control method further includes obtaining a service set that corresponds to the current login user identifier and that matches the device, selecting a service from the service set, sending an authorization request to the open service platform, where the authorization request is used to request to grant, in correspondence to the device identifier of the device, a permission that corresponds to the user identifier and that is for requesting for the selected service, and receiving an authorization result fed back by the open service platform for the authorization request. These steps may be performed before S1102.

Specifically, after the user terminal logged in by using the user identifier is connected to the device, the user terminal may pull, to the open service platform, a service set that corresponds to the current login user identifier and that matches the device, and present the pulled service set to a user. After detecting a selection instruction from the user for a service, the user terminal sends an authorization request to the open service platform according to the selection instruction. After obtaining the authorization request, the open service platform obtains the service that is carried in the authorization request and that is selected by the user terminal from the service set corresponding to the user identifier, and grants, in correspondence to the device identifier of the device, the permission that corresponds to the user identifier and that is for requesting for the selected service. After finishing the authorization, the open service platform correspondingly records the user identifier, the device identifier, and the authorized service, and feeds back an authorization result to the user terminal.

In this embodiment, the device can request for the selected service only after the permission that corresponds to the user identifier and that is for requesting for the selected service is granted to the device, thereby ensuring the security of the user information and the service request.

In an embodiment, before the user terminal obtains the service set that corresponds to the current login user identifier and that matches the device, after the user terminal is connected to an assistant-type device, the user terminal may initiate a binding request to the open service platform, so that when determining that the current login user identifier does not have a binding relationship with any assistant-type device identifier and the device identifier currently connected to the device does not have a binding relationship with any user identifier, the open service platform establishes the binding relationship between the current login user identifier and the device identifier currently connected to the device. The binding relationship therebetween can be unique.

In an embodiment, when receiving an instruction that is of providing a missing service parameter and that is sent when the open service platform determines that service parameters specified by the service request do not include the service parameter required by the specified service, the user terminal may send the instruction to the device, and send, to the open service platform, the received service parameter provided by the device in response to the instruction.

In an embodiment, after receiving a voice message sent by the device, the user terminal may perform speech recognition on the received voice message, determine that the voice message is the service request for requesting for the specified service, obtain the current login user identifier and the device identifier of the device, and send the service request carrying the user identifier and the device identifier to the open service platform. Alternatively, the user terminal may send the received voice message, the current login user identifier, and the device identifier of the device to the open service platform, so that the open service platform performs speech recognition on the received voice message, and determines that the voice message is the service request for requesting for the specified service. After receiving the voice message that is fed back by the open service platform and that is obtained through conversion according to the service request result, the user terminal feeds back the voice message to the device.

In an embodiment, the user terminal may receive an interaction page that is of the specified service and that is delivered to the user terminal when the open service platform determines that an interaction type of the service is a type of interaction that a user terminal participates in, and feed back the service parameter to the open service platform through the interaction page.

In the foregoing embodiment, data exchange between the user terminal and the device takes place when the user terminal is logged in by using the user identifier and has a binding relationship with the device identifier, thereby further ensuring the security of the user information and the service requests.

Figure 12:
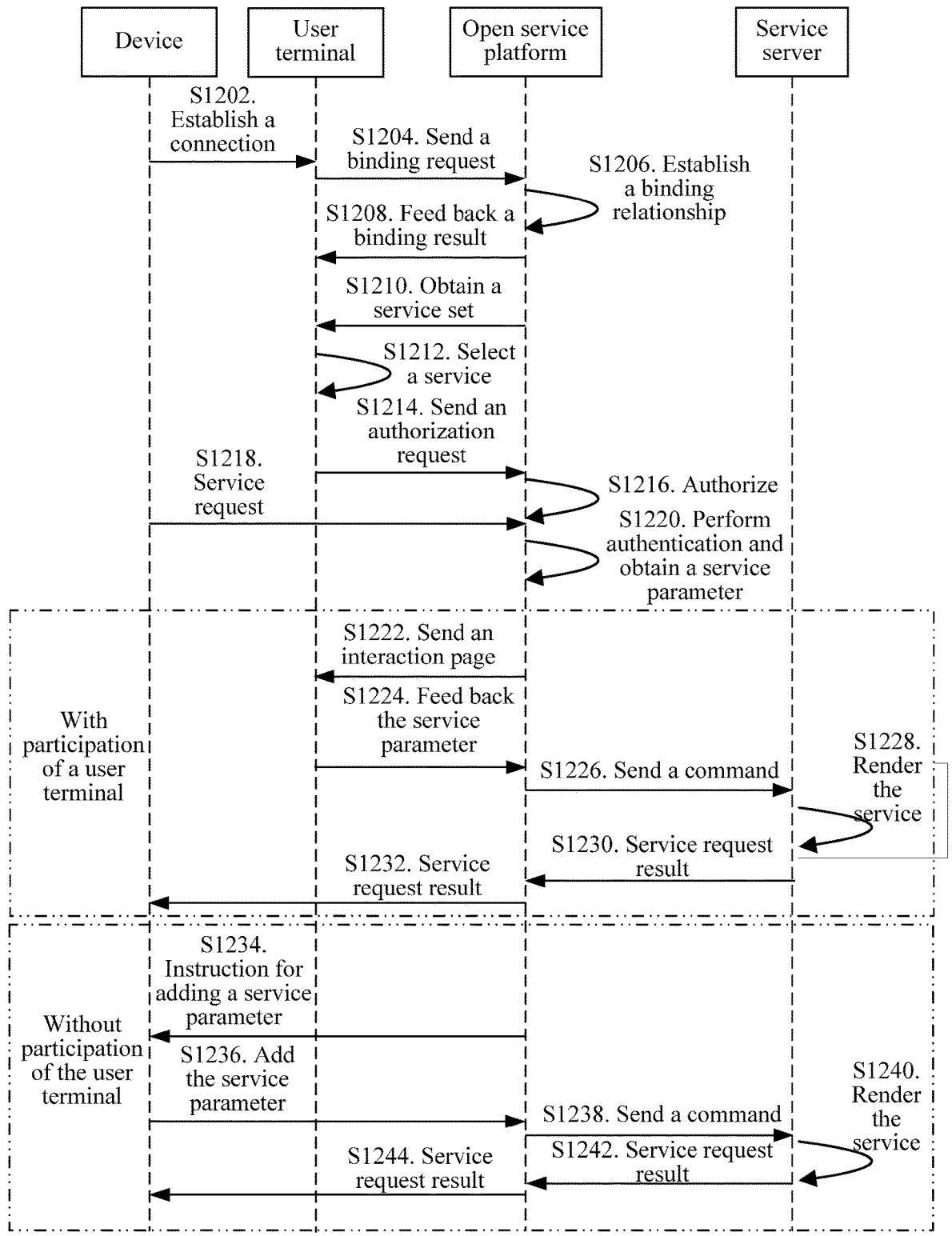
FIG. 12 is a signaling diagram of a service requesting method in a device control method according to another embodiment.

As shown in FIG. 12, in a specific embodiment, a device control method is provided. The method includes the following steps.

S1202. A user terminal logged in by using a user identifier establishes a connection to an assistant-type device.

S1204. The user terminal logged in by using the user identifier sends a binding request to an open service platform.

S1206. When determining that the user identifier does not have a binding relationship with any assistant-type device identifier and a device identifier of a device does not have a binding relationship with any user identifier, the open service platform establishes the binding relationship between the user identifier and the device identifier of the device.

S1208. The open service platform feeds back a binding result to the user terminal.

S1210. The user terminal obtains a service set that corresponds to a current login user identifier and that matches the device.

S1212. The user terminal selects a service from the service set.

S1214. The user terminal sends an authorization request to the open service platform, where the authorization request is used to request to grant, in correspondence the device identifier of the device, a permission that corresponds to the user identifier and that is for requesting for the selected service.

S1216. The open service platform receives an authorization request that is initiated by the user terminal logged in to by using the user identifier and that is used to authorize the device; obtains, according to the authorization request, a service selected by the user terminal from the service set corresponding to the user identifier; and grants, in correspondence to the device identifier of the device, the permission that corresponds to the user identifier and that is for requesting for the selected service.

S1218. The open service platform receives a service request initiated by device for calling a specified service.

S1220. The open service platform searches for a user identifier bound to the device identifier of the device, authenticates the permission for requesting for the specified service by the device, and when determining that the device identifier has the permission that corresponds to the user identifier and that is for requesting for the specified service, obtains a service parameter specified by the service request.

S1222. When determining that obtained service parameters do not include a particular service parameter required for requesting for the specified service, and determining that an interaction type of the service is a type of interaction that a user terminal participates in, the open service platform sends an interaction page of the service to the user terminal logged in to by using the user identifier.

S1224. The open service platform obtains a service parameter fed back by the user terminal through the interaction page.

S1226. The open service platform sends, to a service server corresponding to a public identifier to which the specified service belongs, a command of requesting for the specified service according to the service parameter and user information that corresponds to the user identifier.

S1228. The service server renders the service according to the command.

S1230. The service server returns a service request result to the open service platform.

S1232. The open service platform feeds back the service request result to the device.

S1234. When determining that the obtained service parameters do not include the service parameter required for requesting for the specified service and the service request does not need participation of the user terminal, the open service platform sends, to the device, an instruction of providing the missing service parameter.

S1236. The open service platform receives the service parameter provided by the device in response to the instruction.

S1238. The open service platform sends, to the service server corresponding to the public identifier to which the specified service belongs, a command of requesting for the specified service according to one or more of the obtained service parameters, the additionally provided service parameter, and the user information corresponding to the user identifier.

S1240. The service server renders the service according to the command.

S1242. The open service platform receives a service request result that is fed back by the service server for the command.

S1244. The open service platform feeds back the service request result to the device.

In this embodiment, a binding relationship between the device identifier and the user identifier is established, and the permission that corresponds to the user identifier and that is for requesting for the specified service may be granted to the device by using the device identifier. After the user initiates, by using the device, the service request for requesting for the specified service, if the device has, by using a corresponding device identifier, the permission that corresponds to the user identifier and that is for requesting for the specified service, the device may call the specified service by using the service server corresponding to the public identifier to which the specified service belongs, and obtain the corresponding service request result. The device does not need to log in to the user terminal by using the user identifier to perform a series of operations to request for the service, thereby simplifying the operations, and improving the efficiency of making service requests.

In an embodiment, in the interaction process between the device and the open service platform in FIG. 12, data may be transferred by using the user terminal. The data exchange between the user terminal and the device takes place when the user terminal is logged in by using the user identifier and has a binding relationship with the device identifier, thereby further ensuring the security of the user information and the service requests It should be understood that although the steps in the embodiments of this application are not necessarily performed in an order indicated by the step numbers. Unless explicitly stated in this specification, the execution of these steps is not strictly sequential, and these steps may be performed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

Figure 13:
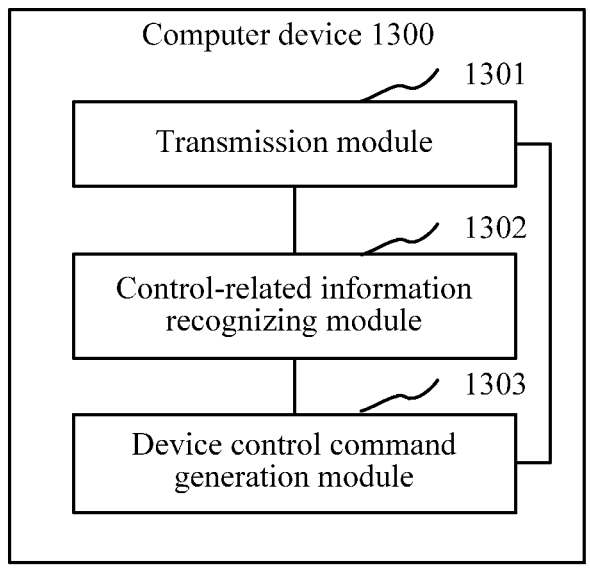
FIG. 13 is a block diagram of a computer device according to an embodiment.

FIG. 13 is a block diagram of a computer device 1300 according to an embodiment. For an internal structure of the computer device 1300, refer to the structure shown in FIG. 2. Some or all of the following modules may be implemented by using software, hardware, or a combination thereof. Referring to FIG. 13, the computer device 1300 includes a transmission module 1301, a control-related information recognizing module 1302, and a device control command generation module 1303.

The transmission module 1301 is configured to obtain a first message initiated in an instant messaging group by using a first device identifier.

The control-related information recognizing module 1302 is configured to determine, according to the first message, control-related information corresponding to at least a second device associated with a second device identifier in the instant messaging group.

The device control command generation module 1303 is configured to generate, according to the control-related information, a device control command corresponding to the second device identifier.

The transmission module 1301 is configured to transmit the device control command to the second device corresponding to the second device identifier, and receive a second message that is sent by the second device in the instant messaging group and that includes a device control command execution result.

According to the computer device 1300, the first device identifier and the second device identifier belong to the same instant messaging group. After a first device corresponding to the first device identifier initiates the first message in the instant messaging group, the first device may determine, based on the first message, the control-related information corresponding to the at least the second device associated with the second device identifier in the instant messaging group, generate the device control command according to the control-related information, and transmit the device control command to the second device. The second message including the device control command execution result is shared through the instant messaging group after the second device executes the device control command. Based on the instant messaging group, devices belonging to the same instant messaging group may be automatically controlled by using an instant messaging message mechanism without user participation, thereby greatly improving the device control efficiency.

Figure 14:
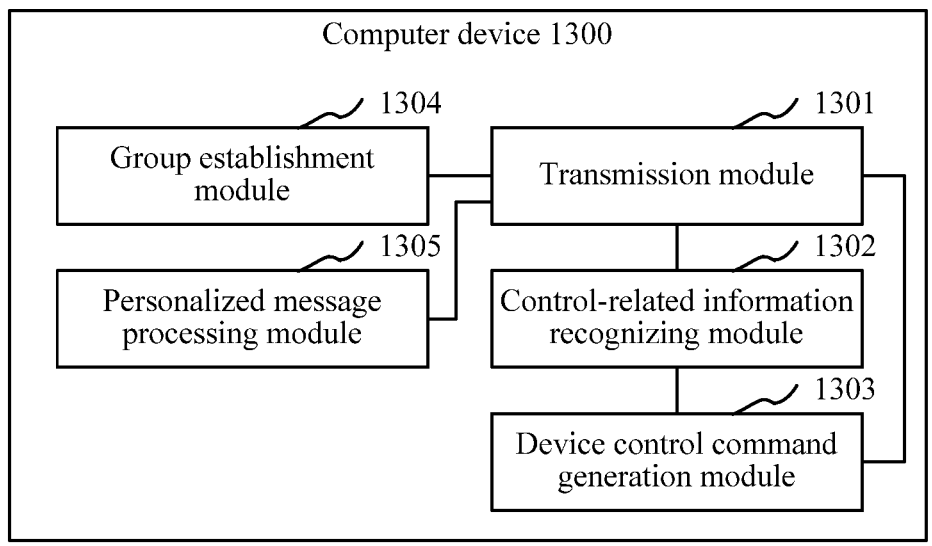
FIG. 14 is a block diagram of a computer device according to another embodiment.

As shown in FIG. 14, in an embodiment, the computer device 1300 further includes a group establishment module 1304 and a personalized message processing module 1305. In some embodiments, the group establishment module 1304 is configured to obtain an instant messaging group establishment command initiated by using a user identifier, determine, according to the instant messaging group establishment command, device identifiers related to the user identifier, where the related device identifiers include the first device identifier and the second device identifier, and establish an instant messaging group including the determined device identifiers.

In an embodiment, the group establishment module 1304 is further configured to obtain the instant messaging group establishment command initiated by an instant messaging client that is logged in by using the user identifier, and obtain device identifiers specified by the instant messaging group establishment command, where when the instant messaging client initiates the instant messaging group establishment command, a terminal that runs the instant messaging client and devices corresponding to the specified device identifiers are connected to the same wireless network.

In an embodiment, the control-related information recognizing module 1302 is further configured to determine, according to the second message, control-related information corresponding to the first device.

The device control command generation module 1303 is further configured to generate, according to the control-related information corresponding to the first device identifier, a device control command corresponding to the first device.

The transmission module 1301 is further configured to transmit the device control command corresponding to the first device to the first device; and receive a third message that is sent by the first device in the instant messaging group and that includes a device control command execution result.

In an embodiment, the control-related information recognizing module 1302 is further configured to obtain text content obtained according to the first message, perform segmentation processing on the text content, to obtain corresponding word segments, find matching keywords in the word segments according to a control-related information template corresponding to the at least one second device identifier in the instant messaging group, and obtain, according to the matching keywords, the control-related information corresponding to at least the second device.

In an embodiment, the control-related information recognizing module 1302 is further configured to input the control-related information into a machine learning model corresponding to the corresponding second device identifier. The control-related information recognizing module 1302 can stop processing the control-related information when the machine learning model outputs a result indicating not to perform an action. The control-related information recognizing module 1302 can, when the machine learning model outputs a result indicating to perform an action, generate, according to the result indicating to perform an action, a device control command corresponding to the second device.

The personalized message processing module 1305 is configured to obtain a user-specific attribute corresponding to the user identifier, adjust content of the second message according to the user-specific attribute, where the adjusted second message includes the device control command execution result, and send the adjusted second message via push messaging to an instant messaging client corresponding to the user identifier.

In an embodiment, the control-related information recognizing module 1302 is further configured to analyze a targeted object of the first message, and, when the targeted object is at least one device identifier in the instant messaging group, perform the step of determining, according to the first message, the control-related information corresponding to at least the second device associated with the second device identifier in the instant messaging group.

In an embodiment, the control-related information includes at least one of sensor perception information, device execution action description information, environment description information generated according to the sensor perception information, time information, and location information.

Figure 15:
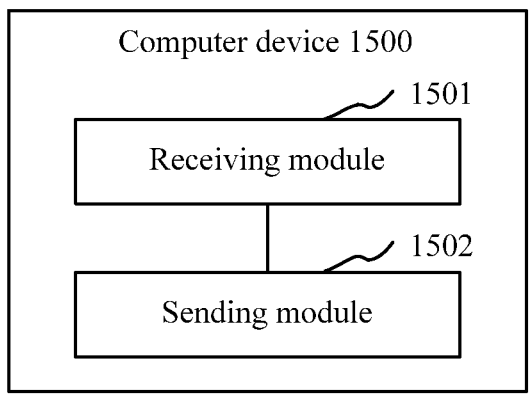
FIG. 15 is a block diagram of a computer device according to still another embodiment.

FIG. 15 is a block diagram of a computer device 1500 according to still another embodiment. For an internal structure of the computer device 1500, refer to the structure shown in FIG. 2. Some or all of the following modules may be implemented by using software, hardware, or a combination thereof. Referring to FIG. 15, the computer device 1500 includes a receiving module 1501 and a sending module 1502.

The receiving module 1501 is configured to obtain a first message initiated in an instant messaging group by using a first device identifier.

The sending module 1502 is configured to send the first message to a second device corresponding to a second device identifier in the instant messaging group, so that the second device determines, according to the first message, control-related information corresponding to the second device, generates a device control command according to the control-related information, and executes the generated device control command.

The receiving module 1501 is further configured to receive a second message that is sent by the second device associated with a second device identifier in the instant messaging group and that includes a device control command execution result.

In some embodiments, the first device identifier and the second device identifier belong to the same instant messaging group. After a first device corresponding to the first device identifier initiates the first message in the instant messaging group, the control device 1500 may receive the first message, determine, based on the first message, a second device, and transmit the first message to the second device. Based on the instant messaging group, devices belonging to the same instant messaging group may be automatically controlled by using an instant messaging message mechanism without user participation, thereby greatly improving the device control efficiency.

In an embodiment, the sending module 1502 is further configured to send the second message to the first device corresponding to the first device identifier, so that the first device determines, according to the second message, control-related information corresponding to the first device identifier, generates a device control command according to the control-related information, and executes the generated device control command. In some embodiments, the receiving module 1501 is further configured to receive a third message that is sent by the first device in the instant messaging group and that includes a device control command execution result.

Figure 16:
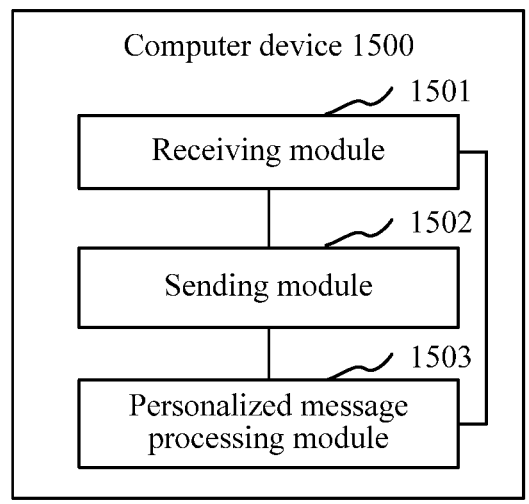
FIG. 16 is a block diagram of a computer device according to yet another embodiment.

As shown in FIG. 16, in an embodiment, the computer device 1500 further includes a personalized message processing module 1503, which is configured to obtain a user-specific attribute corresponding to the user identifier, and to adjust content of the second message according to the user-specific attribute, where the adjusted second message includes the device control command execution result. in some embodiments, the sending module 1502 is further configured to send the adjusted second message by push messaging to an instant messaging client corresponding to the user identifier.

In an embodiment, the sending module 1502 is further configured to analyze a targeted object of the first message, and, when the targeted object is at least one device identifier in the instant messaging group, send the first message to the second device corresponding to the at least one second device identifier in the instant messaging group.

Figure 17:
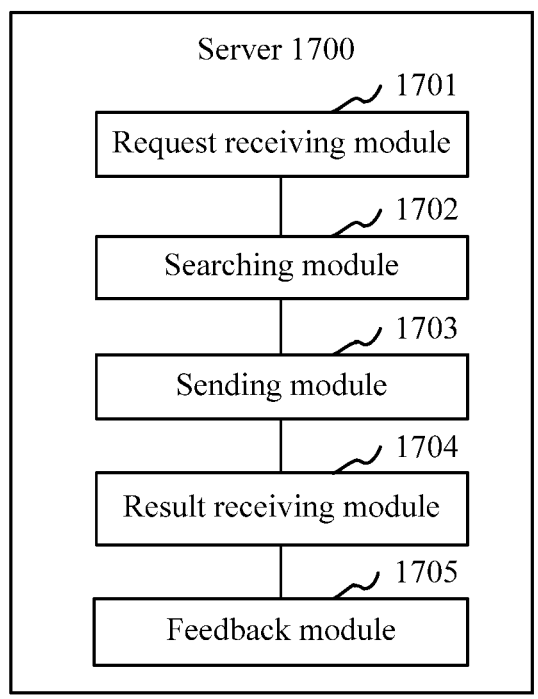
FIG. 17 is a block diagram of a server according to an embodiment.

As shown in FIG. 17, in an embodiment, a server 1700 is provided. For an internal structure of the server 1700, refer to the structure shown in FIG. 2. Some or all of the following modules may be implemented by using software, hardware, or a combination thereof. Referring to FIG. 17, the server 1700 includes a request receiving module 1701, a searching module 1702, a sending module 1703, a result receiving module 1704, and a feedback module 1705.

The request receiving module 1701 is configured to receive a service request initiated by a device for requesting for a specified service.

The searching module 1702 is configured to search for a user identifier bound to a device identifier of the device.

The sending module 1703 is configured to, when the device identifier has a permission that corresponds to the user identifier and that is for requesting for the specified service, determine a public identifier to which the specified service belongs, and send, to a service server corresponding to the public identifier, a command of requesting for the specified service according to user information corresponding to the user identifier.

The result receiving module 1704 is configured to receive a service request result that is fed back by the service server in response to the command.

The feedback module 1705 is configured to feed back the service request result to the device.

According to the server 1700, a binding relationship between the device identifier and the user identifier is established, and the permission that corresponds to the user identifier and that is for requesting for the specified service may be granted to the device by using the device identifier. After the user initiates, by using the device, the service request for requesting for the specified service, if the device has, by using a corresponding device identifier, the permission that corresponds to the user identifier and that is for requesting for the specified service, the device may request for the specified service by using the service server corresponding to the public identifier to which the specified service belongs, and obtain the corresponding service request result. The device does not need to log in to the user terminal by using the user identifier to perform a series of operations to request for the service, thereby simplifying the operations, and improving the efficiency of making service requests.

In an embodiment, the sending module 1703 is further configured to obtain service parameters specified by the service request. When the obtained service parameters do not include a service parameter required for calling the specified service, the sending module 1703 can send, to the device, an instruction of providing the missing service parameter, receive the service parameter additionally provided by the device in response to the instruction, and send, to the service server corresponding to the public identifier, a command of calling the specified service according to one or more of the obtained service parameters, the additionally provided service parameter, and the user information corresponding to the user identifier.

In this embodiment, a user may interact with an open service platform for a plurality of times through the device, to perfect the service parameters required for requesting for the specified service, thereby ensuring a successful service request, and improving the effect of making service requests.

In an embodiment, the request receiving module 1701 is further configured to receive a voice message sent by the device, perform speech recognition on the received voice message, and determine that the voice message is the service request for requesting for the specified service. The feedback module 1705 is further configured to convert the service request result into a voice message; and feed back the voice message to the device.

In this embodiment, a user may directly exchange voice messages with the open service platform through the device, thereby enriching interaction manners, avoiding complex processes of manual operations, and improving the efficiency of making service requests.

In an embodiment, the sending module 1703 is further configured to determine an interaction type of the specified service. When the interaction type is a type of interaction that a user terminal participates in, the sending module 1703 is further configured to send an interaction page of the specified service to a user terminal logged in by using the user identifier, obtain a service parameter fed back by the user terminal through the interaction page, and send, to the service server corresponding to the public identifier, the command of requesting for the specified service according to the service parameter and the user information corresponding to the user identifier.

In this embodiment, when the service request requires participation of the user terminal, the service parameters are perfected by using the user terminal, thereby ensuring a successful service request, and improving the effect of making service requests.

Figure 18:
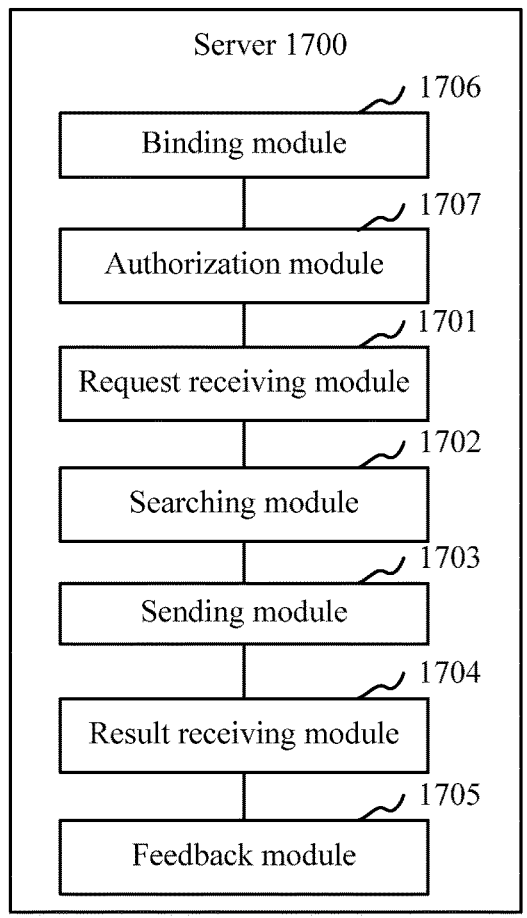
FIG. 18 is a block diagram of a server according to another embodiment.

As shown in FIG. 18, in an embodiment, the server 1700 further includes a binding module 1706 and an authorization module 1707.

The binding module 1706 is configured to receive a binding request initiated after the user terminal logged in by using the user identifier is connected to an assistant-type device, and, when the user identifier does not have a binding relationship with any assistant-type device identifier and the device identifier of the device does not have a binding relationship with any user identifier, establish a binding relationship between the user identifier and the device identifier of the device.

The authorization module 1707 is configured to receive an authorization request that is initiated by the user terminal logged in to by using the user identifier and that is used to authorize the device, obtain, according to the authorization request, a service selected by the user terminal from a service set corresponding to the user identifier, and grant, in correspondence to the device identifier of the device, a permission that corresponds to the user identifier and that is for requesting for the selected service.

In this embodiment, a unique binding relationship between a device and a user is established by using the user identifier and the device identifier, thereby avoiding a problem that after one user is bound to a plurality of assistant-type devices, service requests are simultaneously made by the plurality of assistant-type devices, and ensuring the stability of making service requests. In addition, the device can request for the selected service only after the permission that corresponds to the user identifier and that is for requesting for the selected service is granted to the device, thereby ensuring the security of the user information and the service requests.

Figure 19:
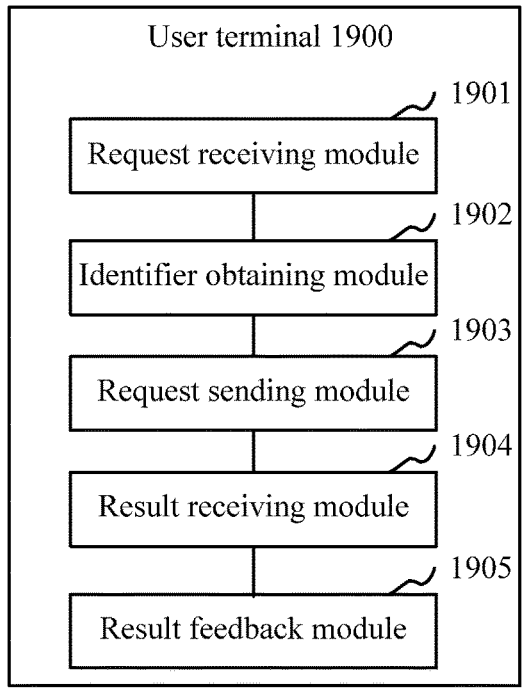
FIG. 19 is a block diagram of a user terminal according to an embodiment.

As shown in FIG. 19, in an embodiment, a user terminal 1900 is provided. For an internal structure of the user terminal 1900, refer to the structure shown in FIG. 2. Some or all of the following modules may be implemented by using software, hardware, or a combination thereof. Referring to FIG. 19, the user terminal 1900 includes a request receiving module 1901, an identifier obtaining module 1902, a request sending module 1903, a result receiving module 1904, and a result feedback module 1905.

The request receiving module 1901 is configured to receive a service request initiated by a device for requesting for a specified service.

The identifier obtaining module 1902 is configured to obtain a current login user identifier and a device identifier of the device.

The request sending module 1903 is configured to send the service request carrying a user identifier and the device identifier to an open service platform, so that when the device identifier and the user identifier have a binding relationship and the device identifier has a permission that corresponds to the user identifier and that is for requesting for the specified service, the open service platform requests, according to user information corresponding to the user identifier, for the specified service from a service server that accesses the open service platform and that corresponds to a public identifier to which the specified service belongs.

The result receiving module 1904 is configured to receive a service request result that is of requesting for the specified service and that is fed back by the open service platform.

The result feedback module 1905 is configured to feed back the service request result to the device.

According to the user terminal 1900, when the service request initiated by the device for requesting for the specified service is locally received, the current login user identifier and the device identifier of the device together with the service request are sent to the open service platform. If the device has a binding relationship with the user identifier by using a corresponding device identifier, and has the permission that corresponds to the user identifier and that is for requesting for the specified service, the device may request for the specified service by using the service server corresponding to the public identifier to which the specified service belongs, and obtain the corresponding service request result. The device does not need to log in to the user terminal by using the user identifier to perform a series of operations to request for the service, thereby simplifying the operations, and improving the efficiency of making service requests.

Figure 20:
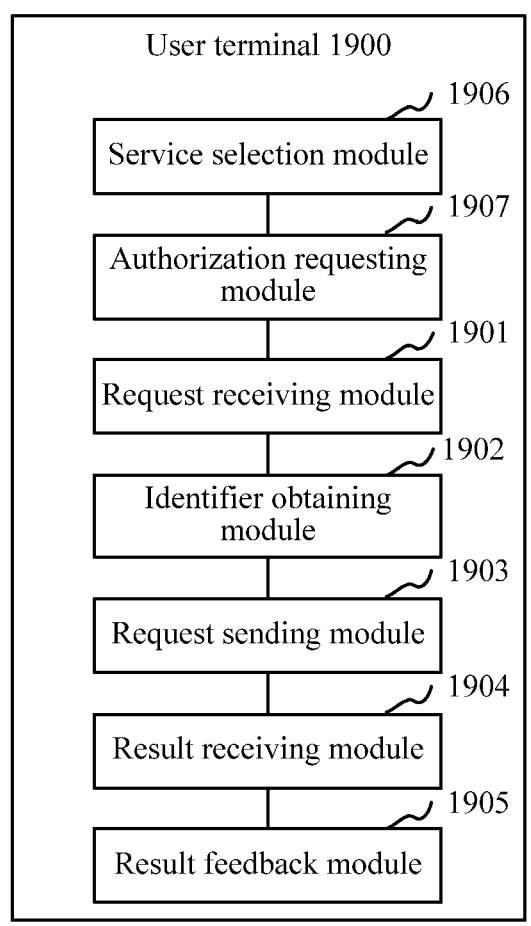
FIG. 20 is a block diagram of a user terminal according to another embodiment.

As shown in FIG. 20, in an embodiment, the user terminal 1900 further includes a service selection module 1906 and an authorization requesting module 1907.

The service selection module 1906 is configured to obtain a service set that corresponds to the current login user identifier and that matches the device. The service selection module 1906 is configured to select a service from the service set, automatically or in response to a user operation.

The authorization requesting module 1907 is configured to send an authorization request to the open service platform, where the authorization request is used to request to grant, in correspondence to the device identifier of the device, a permission that corresponds to the user identifier and that is for service selection module 1906 is configured to request for the selected service, and receive an authorization result fed back by the open service platform for the authorization request.

In this embodiment, the device can request for the selected service only after the permission that corresponds to the user identifier and that is for requesting for the selected service is granted to the device, thereby ensuring the security of the user information and the service requests.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. Any reference to a memory, storage, database, or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. As a description rather than a limitation, the RAM may be implemented in a plurality of forms such as a static RAM (SRAM), a dynamic RAM (DRAM), a synchronous DRAM (SDRAM), a dual data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features of the foregoing embodiments may be combined in various ways. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments only describe several implementations of this application, which are described specifically and in detail, and therefore should not be construed as a limitation to the patent scope of the present disclosure. It should be noted that various changes and improvements may further be made by a person of ordinary skill in the art without departing from the idea of this application, and these changes and improvements all fall within the protection scope of this application. Therefore, the protection scope of this application shall be subject to the appended claims.

What is claimed is:

1. A device control method, comprising:
receiving, by processing circuitry of a server, a first message that is sent to a device messaging group by a first device of the device messaging group, the first device being associated with a first identifier in the device messaging group, the first message indicating at least one of a state of the first device or detected environment information;
determining, by the processing circuitry of the server, whether an action is to be performed in response to the first message based on content of the first message;
identifying, by the processing circuitry of the server, a second device of the device messaging group to control based on the at least one of the state of the first device or the detected environment information included in the first message sent to the device messaging group by the first device, the second device of the device messaging group being identified based on a type of the content included in the first message when the action is determined to be performed in response to the first message;
generating, by the processing circuitry of the server, a device control command to control the identified second device based on the identified second device and the at least one of the state of the first device or the detected environment information included in the first message sent to the device messaging group by the first device, the device control command being generated based on which of a plurality of devices types is associated with the second device; and
sending, by the processing circuitry of the server, a second message to the device messaging group, the second message including the device control command to control the second device of the device messaging group, the second device being associated with a second identifier in the device messaging group, wherein the device messaging group includes the server, the first device, and the second device.

2. The device control method according to claim 1, wherein the sending the second message comprises:
sending the second message to each of a plurality of devices included in the device messaging group.

3. The device control method according to claim 1, wherein the first message indicates the state of the first device, the state of the first device indicating an operation state of the first device.

4. The device control method according to claim 1, wherein the first message indicates the detected environment information.

5. The device control method according to claim 1, wherein the first message identifies does not identify the second device.

6. The device control method according to claim 1, wherein the second message indicates the at least one of the state of the first device or the detected environment information.

7. The device control method according to claim 1, further comprising:
receiving a first request from a user to create the device messaging group;
determining a plurality of device identifiers of a plurality of devices with binding relationships with a user identifier of the user, the plurality of device identifiers including the first identifier and the second identifier;
providing an indication of the plurality of devices to the user;
receiving a second request indicating which of the plurality of devices to include in the device messaging group; and
creating the device messaging group based on which of the plurality of devices are indicated by the request.

8. An information processing apparatus, comprising:
processing circuitry configured to:
receive a first message that is sent to a device messaging group by a first device of the device messaging group, the first device being associated with a first identifier in the device messaging group, the first message indicating at least one of a state of the first device or detected environment information;
determine whether an action is to be performed in response to the first message based on content of the first message;
identify a second device of the device messaging group to control based on the at least one of the state of the first device or the detected environment information included in the first message sent to the device messaging group by the first device, the second device of the device messaging group being identified based on a type of the content included in the first message when the action is determined to be performed in response to the first message;
generate a device control command to control the identified second device based on the identified second device and the at least one of the state of the first device or the detected environment information included in the first message sent to the device messaging group by the first device, the device control command being generated based on which of a plurality of devices types is associated with the second device; and send a second message to the device messaging group, the second message including the device control command to control the second device of the device messaging group, the second device being associated with a second identifier in the device messaging group, wherein the device messaging group includes the information processing apparatus, the first device, and the second device.

9. The information processing apparatus according to claim 8, wherein the processing circuitry is configured to:
send the second message to each of a plurality of devices included in the device messaging group.

10. The information processing apparatus according to claim 8, wherein the first message indicates the state of the first device, the state of the first device indicating an operation state of the first device.

11. The information processing apparatus according to claim 8, wherein the first message indicates the detected environment information.

12. The information processing apparatus according to claim 8, wherein the first message identifies does not identify the second device.

13. The information processing apparatus according to claim 8, wherein the second message indicates the at least one of the state of the first device or the detected environment information.

14. The information processing apparatus according to claim 8, wherein the processing circuitry is configured to:
receive a request from a user to create the device messaging group, the request indicating which of a plurality of devices to include in the device messaging group; and
create the device messaging group based on which of the plurality of devices are indicated by the request.

15. A non-transitory computer-readable storage medium storing instructions which when executed by a processor cause the processor to perform a device control method of a server, the device control method comprising:
receiving a first message that is sent to a device messaging group by a first device of the device messaging group, the first device being associated with a first identifier in the device messaging group, the first message indicating at least one of a state of the first device or detected environment information;
determining whether an action is to be performed in response to the first message based on content of the first message;
identifying a second device of the device messaging group to control based on the at least one of the state of the first device or the detected environment information included in the first message sent to the device messaging group by the first device, the second device of the device messaging group being identified based on a type of the content included in the first message when the action is determined to be performed in response to the first message;
generating, by processing circuitry, a device control command to control the identified second device based on the identified second device and the at least one of the state of the first device or the detected environment information included in the first message sent to the device messaging group by the first device, the device control command being generated based on which of a plurality of devices types is associated with the second device; and
sending a second message to the device messaging group, the second message including the device control command to control the second device of the device messaging group, the second device being associated with a second identifier in the device messaging group, wherein the device messaging group includes the server, the first device, and the second device.

16. The non-transitory computer-readable storage medium according to claim 15, wherein the first message indicates the state of the first device, the state of the first device indicating an operation state of the first device.

17. The non-transitory computer-readable storage medium according to claim 15, wherein the first message indicates the detected environment information.

18. The device control method according to claim 1, wherein the generating comprises:
generating, via a trained model, the device control command based on the at least one of the state of the first device or the detected environment information included in the first message received from the first device, the trained model being configured to extract at least one keyword from the first message and generate the device control command based on the at least one keyword.

19. The device control method according to claim 1, further comprising:
identifying, by the processing circuitry of the server, a third device of the device messaging group to control based on the at least one of the state of the first device or the detected environment information included in the first message sent to the device messaging group by the first device;
generating, by the processing circuitry of the server, a device control command to control the identified third device based on the identified third device and the at least one of the state of the first device or the detected environment information included in the first message sent to the device messaging group by the first device, the device control command being generated based on which of the plurality of devices types is associated with the third device; and
sending, by the processing circuitry of the server, a third message to the device messaging group, the third message including the device control command to control the third device of the device messaging group, the third device being associated with a third identifier in the device messaging group.

20. The device control method according to claim 1, further comprising:
receiving a binding request from a user terminal logged into a messaging service with a user identifier and with an established connection with the first device;
establishing a binding relationship between a user identifier and the first identifier of the first device; and
providing the first message to the device messaging group based on the binding relationship being established between the user identifier and the first identifier of the first device.

* * * * *